United States Patent
Kishi et al.

(10) Patent No.: US 12,312,138 B2
(45) Date of Patent: May 27, 2025

(54) CONTAINER AND CONTAINER PRODUCT

(71) Applicants: Yumiko Kishi, Kanagawa (JP);
Takayuki Nakamura, Kanagawa (JP);
Toshishige Fujii, Kanagawa (JP)

(72) Inventors: Yumiko Kishi, Kanagawa (JP);
Takayuki Nakamura, Kanagawa (JP);
Toshishige Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 230 days.

(21) Appl. No.: 18/116,871

(22) Filed: Mar. 3, 2023

(65) Prior Publication Data
US 2023/0286709 A1 Sep. 14, 2023

(30) Foreign Application Priority Data

Mar. 8, 2022 (JP) ................................. 2022-034883
Oct. 21, 2022 (JP) ................................. 2022-168886

(51) Int. Cl.
*B65D 51/24* (2006.01)
*G06K 1/12* (2006.01)
(Continued)

(52) U.S. Cl.
CPC ............ *B65D 51/245* (2013.01); *G06K 19/08* (2013.01)

(58) Field of Classification Search
CPC .............. B65D 51/245; B65D 2203/06; B65D 85/804; B65D 25/205; B65D 85/8058;
(Continued)

(56) References Cited

U.S. PATENT DOCUMENTS

| 4,990,792 A | 2/1991 | Frei | |
| 10,667,683 B2 * | 6/2020 | Jackson | ............. G02B 27/0172 |

(Continued)

FOREIGN PATENT DOCUMENTS

| CN | 114746278 A * | 7/2022 | ........... B65D 1/0261 |
| JP | 2003-114198 | 4/2003 | |

(Continued)

OTHER PUBLICATIONS

Thoroe, "The impact of RFID on management of returnable containers" (Year: 2009).*

(Continued)

*Primary Examiner* — Thien T Mai
(74) *Attorney, Agent, or Firm* — XSENSUS LLP

(57) ABSTRACT

A container includes: a container body; a cap to seal the container body; an identification code on a top surface of the cap; and multiple concaves on the container body. The multiple concaves on the container body forms a first image having a first area, the identification code on the cap forms a second image having a second area smaller than the first area, the container body has a first diffuse reflectance difference between the first image and a portion excluding the first image, and the identification code has a second diffuse reflectance difference between a code portion and a background portion excluding the code portion in the second image. The second diffuse reflectance difference is larger than the first diffuse reflectance difference.

20 Claims, 14 Drawing Sheets

(51) Int. Cl.
  *G06K 19/06* (2006.01)
  *G06K 19/08* (2006.01)
(58) Field of Classification Search
  CPC ............ B65D 2203/00; B65D 85/8043; B65D 2203/02; B65D 71/08; G02B 27/0172; G06K 7/1413; G06K 19/06028; G06K 19/08; G06K 19/06159; G06K 19/06018; G06K 19/00; G06K 19/0614; G06K 7/10831; G06K 7/14; G06K 7/1465; G06K 1/126; G06K 19/07758; G06K 19/0776
  See application file for complete search history.

(56) References Cited

U.S. PATENT DOCUMENTS

| | | |
|---|---|---|
| 2018/0197054 A1 | 7/2018 | Suzuki et al. |
| 2020/0272138 A1* | 8/2020 | Reyes ................. G06F 16/9035 |
| 2021/0402805 A1 | 12/2021 | Tamura et al. |
| 2022/0097414 A1 | 3/2022 | Hirayama et al. |
| 2022/0118553 A1 | 4/2022 | Miyanishi et al. |
| 2022/0266392 A1 | 8/2022 | Hirayama et al. |
| 2022/0276042 A1 | 9/2022 | Fujita et al. |
| 2022/0305812 A1 | 9/2022 | Funahashi et al. |
| 2022/0388324 A1 | 12/2022 | Yoshii et al. |
| 2022/0388724 A1 | 12/2022 | Serizawa et al. |
| 2022/0388744 A1 | 12/2022 | Funahashi |
| 2022/0410608 A1* | 12/2022 | Hirayama ............... B41M 5/262 |

FOREIGN PATENT DOCUMENTS

| | | | |
|---|---|---|---|
| JP | 4049739 B2 * | 2/2008 | .......... B65D 1/0261 |
| JP | 2012-155481 | 8/2012 | |
| JP | 2021-176648 | 11/2021 | |
| JP | 2022-035975 | 3/2022 | |
| JP | 2022-035976 | 3/2022 | |
| JP | 2022-056333 | 4/2022 | |
| JP | 2022-057612 | 4/2022 | |
| JP | 2022-058127 | 4/2022 | |
| JP | 2022-086838 | 6/2022 | |
| JP | 2022-187536 | 12/2022 | |
| WO | 2013/045077 A1 | 4/2013 | |
| WO | 2021/117899 A1 | 6/2021 | |

OTHER PUBLICATIONS

Steganography of Encrypted Messages Inside Valid QR Codes (Year: 2020).*
U.S. Appl. No. 18/097,510, filed Jan. 17, 2023, Kazunori Watanabe, et al.
U.S. Appl. No. 17/936,071, filed Sep. 28, 2022, Hiroyuki Tanabe, et al.
U.S. Appl. No. 18/054,912, filed Nov. 14, 2022, Kazunori Watanabe, et al.
U.S. Appl. No. 18/055,423, filed Nov. 15, 2022, Tetsuya Sonoda, et al.
U.S. Appl. No. 18/078,104, filed Dec. 9, 2022, Yoichi Ichikawa.
Extended European Search Report issued Aug. 10, 2023, in corresponding European Patent Application No. 23159006.8, 7pp.

* cited by examiner

| NB:NARROW BAR | THIN BAR |
| WB:WIDE BAR | THICK BAR |
| NS:NARROW SPACE | THIN SPACE |
| WS:WIDE SPACE | THICK SPACE |

CONTAINER AND CONTAINER PRODUCT

CROSS-REFERENCE TO RELATED APPLICATIONS

This patent application is based on and claims priority pursuant to 35 U.S.C. § 119(a) to Japanese Patent Application No. 2022-034883, filed on Mar. 8, 2022, in the Japan Patent Office, and Japanese Patent Application No. 2022-168886, filed on Oct. 21, 2022, in the Japan Patent Office, the entire disclosure of which is hereby incorporated by reference herein.

BACKGROUND

Technical Field

The present disclosure relates to a container and a container product.

Related Art

A label indicating a product name, an ingredient, an expiry date, a barcode, a QR code (registered trademark), a recycle symbol, or a logo is typically attached to a container such as a polyethylene terephthalate (PET) bottle. In addition, such a label includes a design, an image, or a picture to appeal to consumers and to distinguish the individual product from other competitive products to promote sales.

Recently, plastic wastes have caused ocean plastic pollution. Activities to reduce or eliminate plastic wastes and a circular recycling of containers are intensified around the world. In the circular recycling of the containers, a recycling company converts used containers, which are separated and collected, into flakes for raw material of containers, and manufactures containers again. In order to facilitate the circular recycling, preferably, the used containers are thoroughly separated into each material such as containers or labels. However, since the process of removing labels from containers for separate collection is time-consuming, the process is one of the restrictions for thorough separation and collection.

SUMMARY

A container includes: a container body; a cap to seal the container body; an identification code on a top surface of the cap; and multiple concaves on the container body. The multiple concaves on the container body forms a first image having a first area, the identification code on the cap forms a second image having a second area smaller than the first area, the container body has a first diffuse reflectance difference between the first image and a portion excluding the first image, and the identification code has a second diffuse reflectance difference between a code portion and a background portion excluding the code portion in the second image. The second diffuse reflectance difference is larger than the first diffuse reflectance difference.

Further, an embodiment of the present disclosure provides a container product includes: the container described above; and a content in the container.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4B is a diagram of a setup and a metho of photographing the container body in which white diffusing surfaces are provided on both sides in the vicinity of the container body as an example of;

Figure 1A:
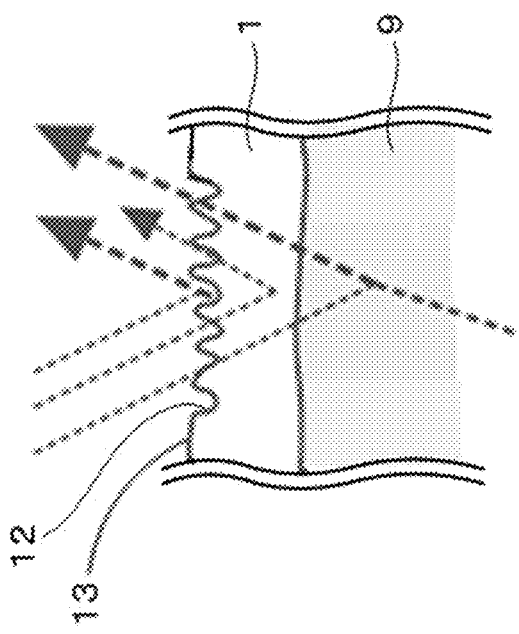
FIG. 1A is a diagram of the surface of the container body before laser processing and diffuse reflection of light on the surface.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the present embodiments, a container suitable for retail sales is provided to facilitates the circular recycling and reduces the read error on a reading identification code.

In typical laser processing to the container such as a beverage bottle, an image is formed on the beverage bottle by the laser light. Since the visibility of the image changes depending on the color of the liquid contained therein and the difference in the absorption rate of the liquid, the barcode read error (read error) frequently occurs. In a case where the barcode is formed (provided) on the top surface of the cap of the beverage bottle instead of forming the barcode on the beverage bottle, the size of the barcode becomes smaller. In such a situation, if the contrast of the barcode is not sufficient to read, the read error also frequently occurs. Preferably, an evaluation and a criterion to determine whether the barcode formed by laser processing is stably read or not depending on the content (i.e., liquid) contained in the beverage bottle are provided. Preferably, the container including a barcode having a sufficient contrast to read depending on the combination of the color of the cap and the barcode colors when the barcode is printed on the top surface of the cap is provided.

An image including multiple concaves formed on the container body will be described. When an image including multiple concaves is formed on the surface of the container body by laser processing, and the concaves are condensed, the diffuse reflectance of the surface becomes larger than that of the surface before the laser processing (FIG. 1A), and a visibly opaque region is formed (FIG. 1B). Herein, the difference in the diffuse reflectance (i.e., diffuse reflectance difference) between the image and a non-image portion is referred to as "Cbottle". In other words, the diffuse reflectance difference is contrast. Using the diffuse reflectance difference between the image and the non-image portion, the image (e.g., characters) formed on the container is visually recognized without using, for example, ink. In a case where a barcode is printed on a paper sheet (e.g., a black barcode is printed on the white paper), the barcode is darker than the paper. By contrast, in a case where the bars among the one-dimensional barcode are formed by laser processing (i.e., processed region (FIG. 1B)) as an identification code and the spaces among the one-dimensional barcode are the non-processed region (FIG. 1A), the processed region (i.e., the bars) is brighter than the non-processed region (i.e., the spaces, the container body). In such a case, the contrast is defined by a difference between a higher diffuse reflectance (i.e., the bars) and a lower diffuse reflectance (i.e., the container body). Thus, the contrast has an always positive value. Herein, the portion of an image formed by laser processing is described as multiple concaves, but the multiple concaves have microscopically uneven shapes.

Figure 1D:
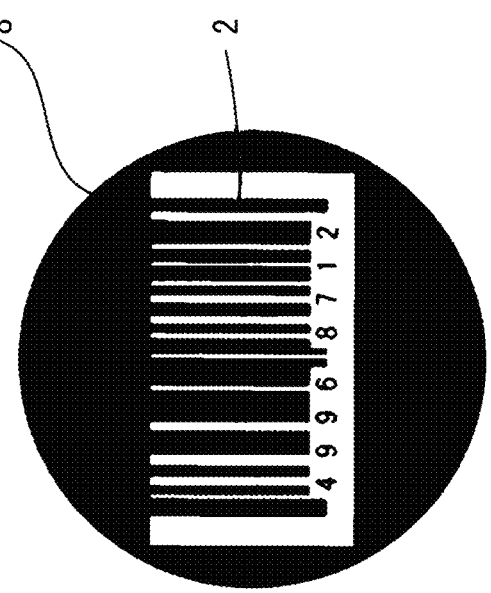
FIG. 1D is a diagram of a one-dimensional barcode as an identification code formed on the top surface of the cap.
Figure 1B:
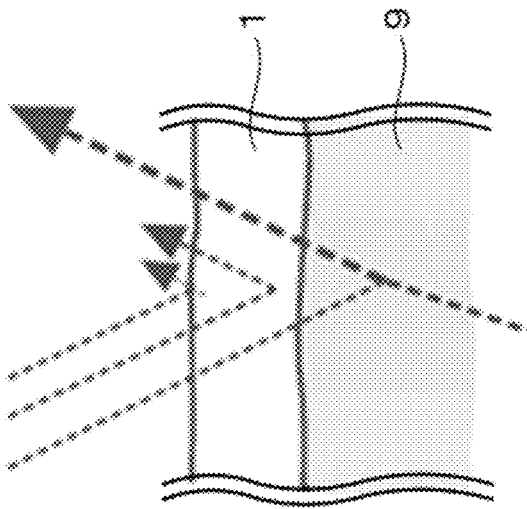
FIG. 1B is a diagram of the surface of the container body and diffuse reflection of the light on the surface including multiple concaves formed by the laser processing.

In the present embodiment, a one-dimensional barcode 2 as an identification code is provided on the top surface of the cap 8 of the container as illustrated in FIG. 1D. The surface of the container body includes an image. An area of the image is larger than an area of the identification code including multiple concaves formed by laser processing. The diffuse reflectance difference between an code portion and a background portion of the identification code is larger than the diffuse reflectance difference between the image and the non-image portion. When the diffuse reflectance difference (i.e., contrast) between the code portion and the background portion of the identification code of the cap of the container is referred to as "Ccap", the conditional expression (a) below is satisfied.

$$\text{Cbottle} < \text{Ccap} \tag{a}$$

By satisfying the conditional expression (a) (i.e., Cbottle<Ccap), an identification code without the read error is reliably provided on the container. A difference in diffuse reflectance between the code portion and the background portion of the identification code represented by Ccap is referred to as a symbol contrast, and is given by the expression [2] below: In a case where the bars are brighter and the container body is darker, which is a reciprocal case where the barcode is printed on a paper sheet with ink, a negative value is obtained unless an absolute value is applied to the expression [2]. Thus, an absolute value is applied so that the value becomes positive as in the case of the contrast.

$$\text{symbol contrast} = |(\text{diffuse reflectance of the background portion of the identification code}) - (\text{diffuse reflectance of the code portion of the identification code})|. \tag{2}$$

In the case of the barcode, the code portion refers to a portion of a bar (i.e., the bar), and the background portion refers to a portion corresponding to a background between the bars of the barcode (i.e., the space). For example, when a white background (white portion) is printed on a green material and a black barcode (black portion) is printed on the white background, the black portion is the code portion and the white portion is the background portion.

A container includes: a container body; a cap to seal the container body; an identification code on a top surface of the cap; and multiple concaves on the container body. The multiple concaves on the container body forms a first image having a first area, the identification code on the cap forms a second image having a second area smaller than the first area, the container body has a first diffuse reflectance difference between the first image and a portion excluding the first image, and the identification code has a second diffuse reflectance difference between a code portion and a background portion excluding the code portion in the second image. The second diffuse reflectance difference is larger than the first diffuse reflectance difference.

Herein, the diffuse reflectance is measured by using, for example, an integrating sphere spectrophotometer such as Cix6 Series™ manufactured by X-Rite, Incorporated. The integrating sphere spectrophotometer can measure only the diffuse reflectance excluding specular reflection light. In particular, in the case of a transparent resin sample, the sample is placed on a light trap so that the light transmitted through the sample is not reflected at places and included in the measurement value. The transmitted light does not return from the light trap, and the diffuse reflectance of the surface is measured.

The identification code on the top surface of the cap may be printed with ink or laser-processed by laser light. Further, as illustrated in FIG. 1D, a white base may be printed on an identification code region and bars may be printed on the white base, or the bars may be directly printed on the cap. When the color of the cap is darker, and if the bar portion is printed with black, the contrast of the identification code becomes smaller. In such a case, preferably, the background color is separately printed in the identification code region. The print on the cap may be printed in advance, or may be printed at the time of filling the container with a content (e.g., beverage). However, when a barcode as an identification code is placed on the top surface of the cap, the barcode becomes smaller. If the barcode is smaller and does not have a sufficient contrast to read, the read error frequently occurs. Thus, a criterion for evaluating and judging the symbol contrast of the smaller barcode on the top surface of the cap is provided.

A container includes a container body and a cap for sealing a content within the container body.

Container Body

The container body is not particularly limited to material, shape, size, structure, and color, and is appropriately selected according to the purpose. For example, the material of the container body is resin or glass, but is not limited thereto. The material is appropriately selected according to applications. Examples of the resin of the container body include polyvinyl alcohol (PVA), polybutylene adipate terephthalate (PBAT), polyethylene terephthalate succinate, polyethylene (PE), polypropylene (PP), polyethylene terephthalate (PET), polyvinyl chloride (PVC), polystyrene (PS), polyurethane, epoxy, bio polybutylene succinate (PBS), butylene adipate co-terephthalate (PBAT), polyethylene-starch blend, poly(butylene succinate-co-terephthalate), polylactic acid (PLA), poly(3-hydroxybutyrate-co-3-hydroxyhexanoate) (PHBH), polyhydroxyalkanoate (PHA), Bio-PET 30, Bio-polyamide (PA) 610, 410, and 510, Bio-PA1012 and 10T, Bio-PA11T, MXD10, Bio polycarbonate, Bio polyurethane, Bio-Polyethylene, Bio-PET100, Bio-PA11, Bio-PA1010. These may be used alone or in combination thereof. Among these resins, biodegradable resins such as polyvinyl alcohol, polybutylene adipate terephthalate, and polyethylene terephthalate succinate are preferable in terms of the environmental load.

The shape of the container body may be appropriately selected according to applications and is not particularly limited thereto. Examples of the shape of the container body include bottle-shaped, prism-shaped, cylinder-shaped, box-shaped, or cone-shaped. Among these shapes, the bottle-shaped is preferable. The bottle-shaped container body (i.e., bottle) has a finish portion (i.e., spout), a shoulder portion integrated with the finish portion, a sidewall portion integrated with the shoulder portion, and a bottom portion integrated with the sidewall portion. The size of the container body may be appropriately selected according to applications and not particularly limited thereto. The structure of the container body is not particularly limited and may be appropriately selected depending on the intended purpose. For example, the container body may have a single-layer structure or a multi-layer structure.

Examples of the color of the container body include colorless and transparent, colored and transparent, and colored and opaque. Among the colors of the container body, especially in a colorless and transparent container, the visibility of the image formed by the laser processing is lower. In such a case, the barcode formed on the container body is hard to read. In some embodiments of the present invention, a barcode having a higher visibility of the image is provided, even if the container is colorless and transparent.

Image

The surface of the container body includes multiple concaves, and an image having an area larger than the identification code of the top surface of the cap is formed on the surface. Since the image includes the non-concave portion in which concaves are not formed, the laser light is not emitted to the whole image. Thus, the productivity is increased by an area ratio of the non-concave portion. However, when the area ratio of the non-concave portion is increased, the visibility value is decreased, so that a condition for the area ratio of the non-concave portion may be provided.

The image includes, for example, characters, symbols, graphics, images, and codes. Specifically, the image includes information such as a name, component, an identification number, a manufacturer name, a date of manufacture, an expiry date, an identification code (e.g., barcode or two-dimensional code), a recycle symbol, or a logo. Among these images, the identification code is indispensable information. When managing products, divisions or departments of a company, or assets, numbers or symbols for identification are assigned in a "code". Typically, the code for identifying products are referred to as an "identification code." The identification code is, for example, a "product identification code" such as a Japanese article numbering (JAN) code. The JAN code is used to manage a product when the product is bought at a cash register. The JAN code is a global product identification code indicating a specification and the manufacturer of the product. Typically, the JAN code is displayed on the product or the package as a barcode and used. In addition, a two-dimensional code that allows storage of a lot of information is one of the identification codes, and the most typical two-dimensional code is a QR code (registered trademark). Herein, a barcode as the typical identification code will be described because the same effect is obtained with the two-dimensional code.

Figure 2:
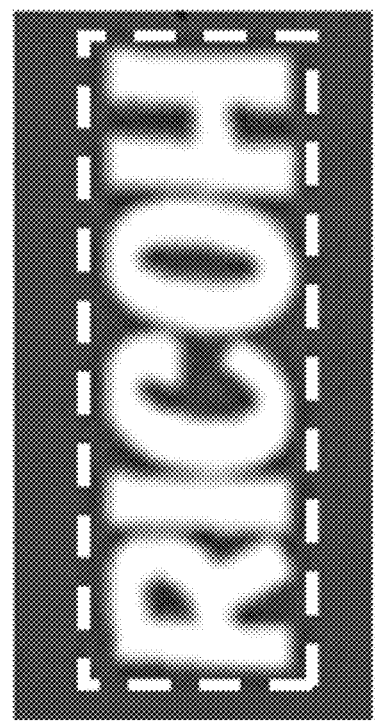
FIG. 2 is a diagram of an image formed on the container body having an area larger than an area of the identification code on the top surface of the cap in FIG. 1D.
Figure 3:
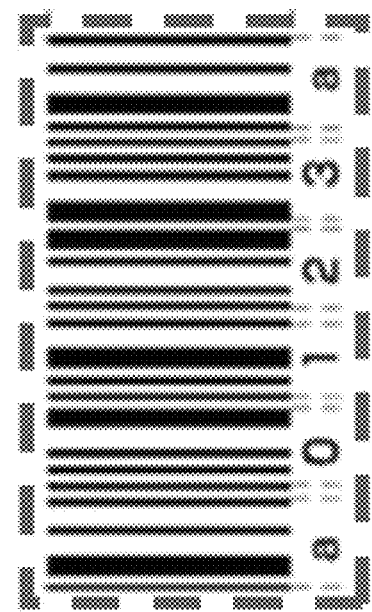
FIG. 3 is a diagram of another image formed on the container body having an area larger than the identification code on the top surface of the cap in FIG. 1D.

The concave is formed from multiple processed portions, and the multiple processed portions are arranged along the first scanning direction (i.e., the main scanning direction). The multiple processed portions may be continuously linearly arranged or discontinuously linearly arranged. Preferably, the processed portion is a circular processed portion or an elliptical processed portion in plain view. In terms of visibility and productivity, preferably, the concave is linearly arranged along the first scanning direction so that the multiple processed portions contact or overlap with each other. In addition, since the image formed on the container body is used for a substitution for a label, preferably, the area of the image to be formed is larger than the area of the barcode of the cap. The image including a character or the picture formed in the larger area is clearly recognized. Herein, the area of the barcode is the area enclosed by the dashed line in FIG. 2, and the area of the image is the area enclosed by the dashed line in FIG. 3. The area of the image is approximately calculated within the dashed enclosed area, and the area of the image of the whole container (i.e., the PET bottle) is integrated.

The non-concave portion is a flat area of the container body in which no concave is formed. There are two scanning directions of the laser light, a main scanning direction and a sub-scanning direction. The main scanning direction and the sub-scanning direction are orthogonal to each other. The main scanning direction is a direction in which the laser emitter moves the laser light, and the sub-scanning direction is a direction in which the container body, which is an object of laser processing, moves. The first scanning direction is the main scanning direction in the laser processing, and the second scanning direction is the sub-scanning direction in the laser processing.

Herein, as illustrated in FIG. 1B, when multiple concaves 12 are formed on the surface of the container body 1 by laser processing and an aggregate the concaves 12, which are condensed to form the image 11. The diffuse reflectance of the surface of the container body 1 becomes larger than that of the container body before the laser processing illustrated in FIG. 1A. Thus, as illustrated in FIG. 1B, the concaves are opaque to allow the image 11 is to be visually recognized. As the density of the collection (aggregation) of the multiple concaves 12 increases, the degree of the opacity (whiteness) increases and visibility increases (i.e., it is easy to visually recognize). However, the laser processing takes more time and productivity decreases. In addition, the container body 1 is thermally deformed by heat, or the color of the container changes due to a material property change. Preferably, the concaves 12 condense at a density that does not affect visibility.

Figure 1C:
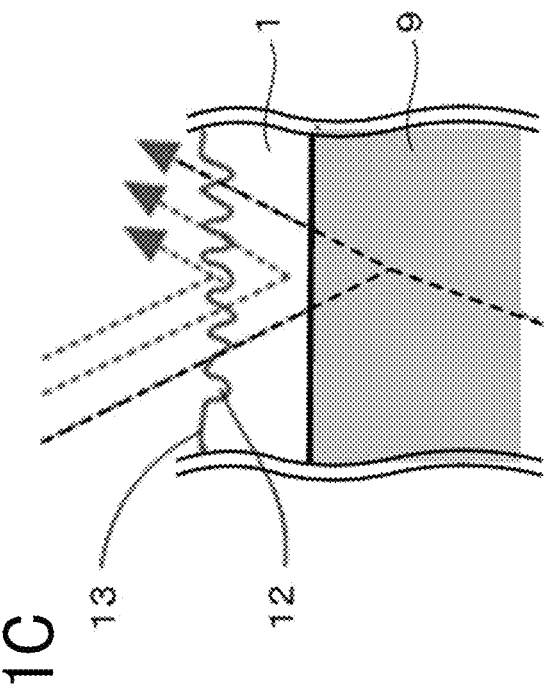
FIG. 1C is a diagram of the surface of the container body containing a content and diffuse reflection of the light on the surface having the multiple concaves formed by the laser processing.

The visibility of the image 11 is determined by the diffuse reflectance of the multiple concaves 12 and by the influence of the transmitted light through the content 9 contained in the container body 1 (FIG. 1C). When the container body 1 is formed of a transparent material such as a PET bottle or glass, the influence of the transmitted light from the content 9 (e.g., liquid) contained in the container body 1 (FIG. 1C) becomes larger. When the content 9 is contained in the container body 1, the visibility value of the image including the concave changes depending on the type and color of the content, and the barcode reading, which is indispensable information, becomes unstable. In addition, when the image 11 is an aggregation of the multiple concaves 12 at a density such that productivity does not decrease, the influence of the transmitted light of the non-concave portions 13 is considered. Thus, as a result of intensive studies, the present inventors have established an evaluation method. In the evaluation method, a visibility value of the surface of the container body 1 having a processed state and the visibility value including the content 9 contained in the container body 1 are evaluated. The evaluation method also determines whether the barcode formed on the container body 1 is reliably read or not, and in a case where the barcode is provided on the top surface of the cap, the barcode in the whole container body is reliably read.

Figure 4B:
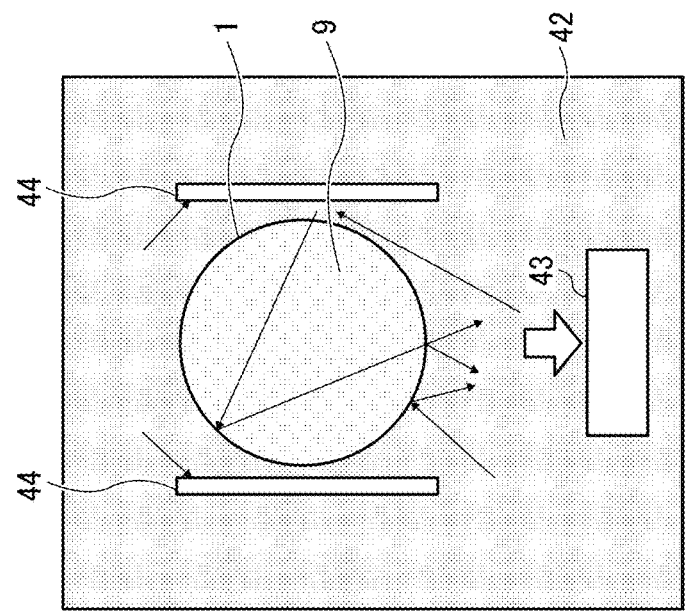
Figure 4A:
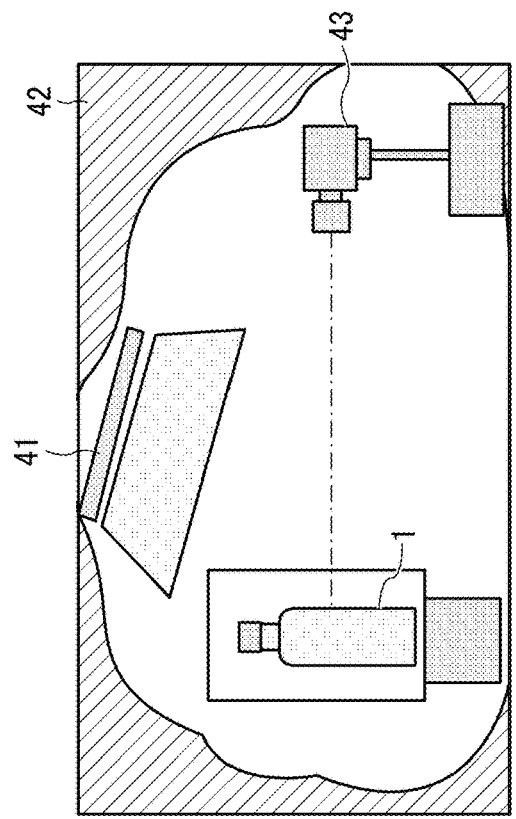
FIG. 4A is a diagram of a setup and a method of photographing the container body as an example.

The visibility evaluation method will be described. In the visibility evaluation method, the container body is photographed, and the luminance of the image that is visually recognizable and the luminance of a portion excluding the image are used for measurement. When photographing the container body, as illustrated in FIG. 4A, a dark room 42 is used in order to eliminate the reflection due to the shape of the container body 1 on the surface of the container body 1. In FIG. 4A, the container body 1 is photographed by the camera 43. As illustrated in FIG. 4B, the light source 41 is arranged at a predetermined angle as a flat light source so that the specular reflection from the surface of the container body 1 is not photographed. Preferably, a pair of white-diffused surfaces 44 are provided at both sides in the vicinity of the container body 1. Specifically, the photograph is taken under the condition below. Accordingly, the image closer to a typical environment is obtained.

Photographing conditions for visibility evaluation method
As illustrated in FIG. 4A, the camera 43, the sample (i.e., container body 1), and the light source 41 are installed in a dark room.
The light source is placed at a position in which the illumination is diffused (diffused illumination). Specifically, the specular reflection from the processed surface diagonally upward of the sample is not detected in the position.
The light source 41 may also be placed at a position diagonally downward or the side surface.
Installing a white surface on the side in the vicinity of the sample so that transmitted light from the surroundings is considered.
The photographing conditions are set as follows so that the white reading value is not saturated.
Photographing Conditions
Camera: Basler Ace acA3088-57 µm (area scan camera)
Lens: Ricoh Lens FL-CC25-2M (F1.4, f25 mm, ⅔")
Aperture: F1.4
Exposure time: 20,000 (µs)
Distance (camera to sample): 500 mm
Light source: LED tracer
The container body contains the content.

Figure 5:
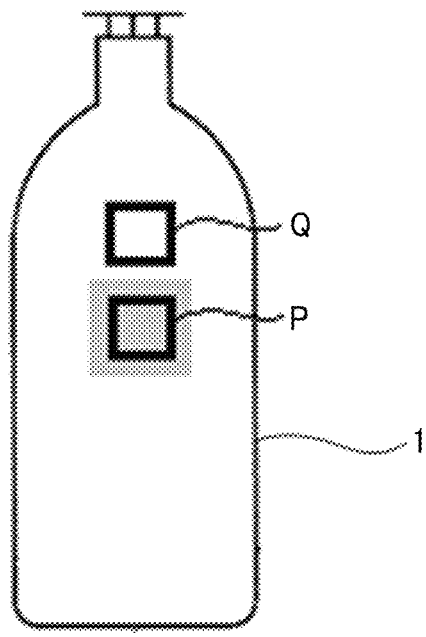
FIG. 5 is a diagram of an image P of the container body and a portion Q excluding the image in photographing the container body.

The lightness of the image and the lightness of the portion excluding the image are measured from the photographed image. As illustrated in FIG. 5, the lightness is converted from output values of the image P and the portion Q excluding the image P. Although, the output value from the camera depends on, for example, the size of the image, preferably, an average value of an area of about several $mm^2$ to several tens $mm^2$ in consideration of variation is used. For the conversion into the lightness, a chart is used. The lightness (L*) of the chart is known (i.e., the known lightness) under the measurement environment of the container body. The chart is photographed by the camera, and the output value is converted into the lightness from the reading value of the camera (G signal) and the known lightness. The conversion method will be described below.

G Signal and Lightness Conversion
A color chart (a gray chart) is photographed and approximated by an n-th degree polynomial. Herein, the lightness of the color chart is known. As an example, the G signal is converted into the lightness by the third order polynomial below.

L*=Lab_1st×G1+Lab_2nd×G2+Lab_3rd×G3+ Lab_const.
Lab_1st=0.461535.
Lab_2nd=−0.000281.
Lab_3rd=0.000000.
Lab_const=1.211053.

Figure 6:
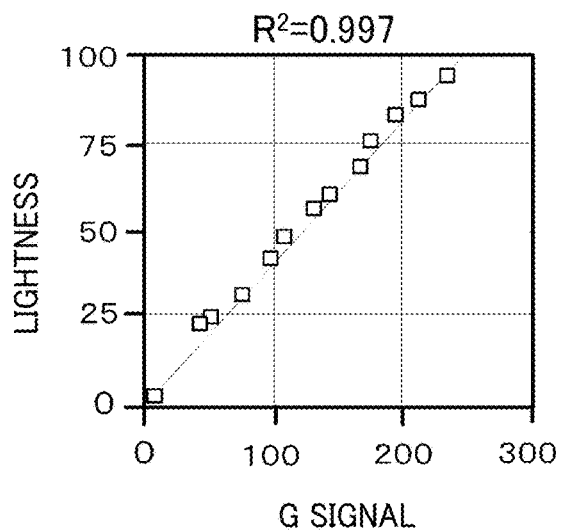
FIG. 6 is a graph of the relation between a G signal and lightness.

FIG. 6 is a graph of the relation between the G signal and the lightness converted from the third order polynomial above. In FIG. 6, the coefficient of determination $r^2$=0.997.

Subjective Evaluation

In the subjective evaluation, the samples were the container body (i.e., PET bottle). The samples were processed by the laser processing with different processing conditions. The content contained in the sample was changed in the subjective evaluation. Statistically, the subjective evaluation score was obtained by Scheffe's method of paired comparisons.

Figure 7:
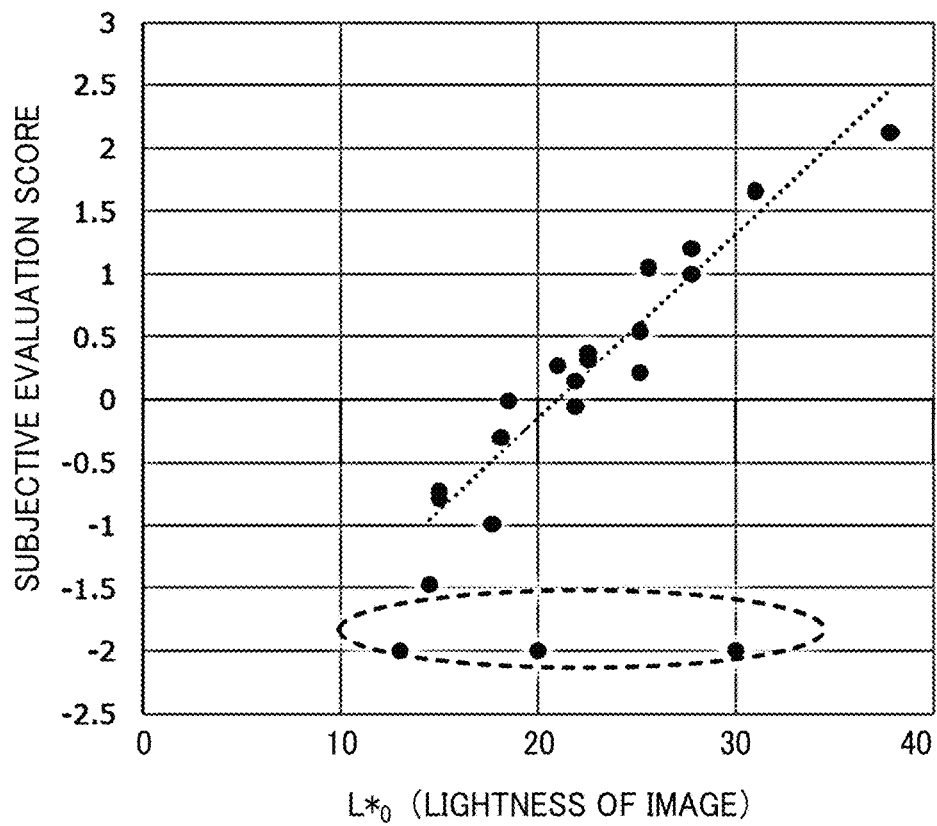
FIG. 7 is a graph of the relation between the lightness ($L^*_0$) of an image and a subjective evaluation score.
Figure 8:
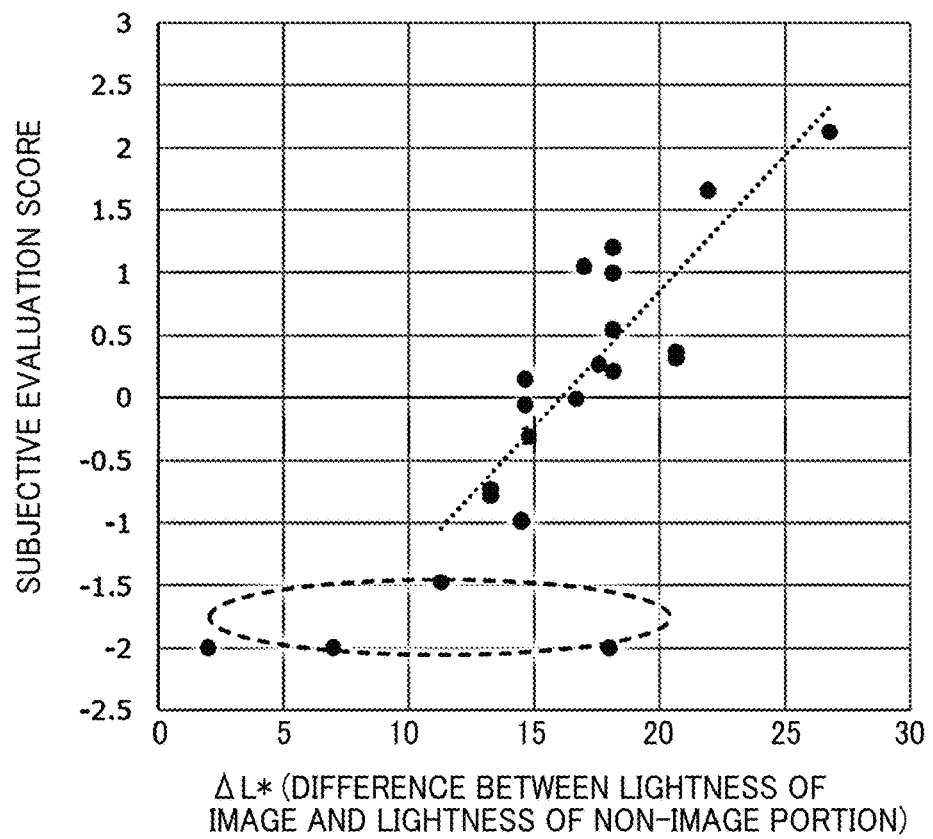
FIG. 8 is a graph of the relation between a difference ($\Delta L^*$) between the lightness of the image and the lightness of the portion excluding the image and the subjective evaluation score.
Figure 9:
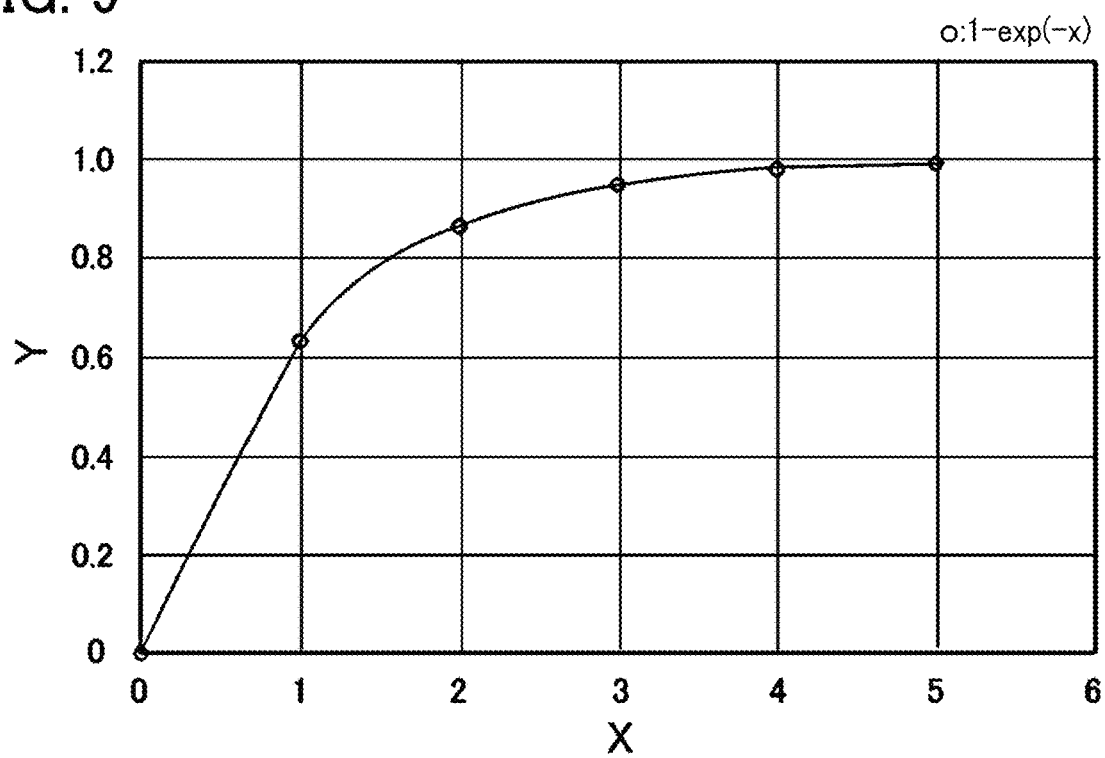
FIG. 9 is a graph of the relation between x and Y in the equation: $Y=1-\exp(-x)$.

Sample: six samples with different laser processing
Content: water, coffee, and tea
Subjective evaluation: Scheffe's method of paired comparisons
Evaluator: 3 persons (The evaluations were conducted twice each)
First evaluation: water for all samples
Second evaluation: water (2 bottles), coffee (2 bottles), tea (2 bottles)
Third evaluation: water (1 bottle), coffee (3 bottles), tea (2 bottles)
Evaluation environment: office room FIG. 7 is a graph of the relation between the subjective evaluation score obtained and the lightness ($L^*_0$) of the image. FIG. 8 is a graph of the relation between the subjective evaluation score obtained and the difference ($L^*_0$) between lightness of the image and the lightness of the portion excluding the image. When the subjective evaluation score by the Shaeffer's method of paired comparisons is higher, the image has a better visibility As illustrated in FIGS. 7 and 8, the samples enclosed by the dashed line have poor correlation. In these samples, the lightness ($L^*_0$) of the image is significantly lower, the lightness difference ($\Delta L^*$) is smaller, or both. In order to obtain an expression with higher correlation with respect to these samples, the expression (1) below was derived by multiplying the lightness $L^*_0$ of the image by (1−exp ($\Delta L^*$)). As illustrated in FIG. 9, since Y=(1−exp (−x)) approaches Y=0 as x decreases, the expression (1) expresses a tendency that the visibility decreases as the lightness difference ($\Delta L^*$) decreases.

Accordingly, the visibility value is given by the expression [1] below $$\text{visibility value} = b_0 \cdot L^*_0 \cdot (1 - \exp(b_1 \cdot \Delta L^*)), \qquad [1]$$

where $L^*_0$ represents the lightness of an image, $\Delta L^*$ represents the difference between the lightness of an image and the lightness of a portion excluding the image, $b_0$ is a positive real number and is preferably around 0.2, and $b_1$ is a negative real number, and preferably around −0.2. The visibility value given by the expression [1]s represents a feature that the visibility is higher as the lightness of an image is higher, and the visibility is lost when the lightness difference from the portion excluding the image is eliminated.

In the container according to the embodiments, the first image of the container body has a visibility value equal to or larger than a predetermined value expressed by an expression [1] below:

$$\text{visibility value} = b_0 \cdot L^*_0 \cdot (1 - \exp(b_1 \cdot \Delta L^*)), \qquad [1]$$

where $L^*_0$ is a lightness value of the first image,
$\Delta L^*$ is a difference between the lightness value of the first image and a lightness value of the portion excluding the first image,
$b_0$ is a positive real number, and
$b_1$ is a negative real number.

Figure 10:
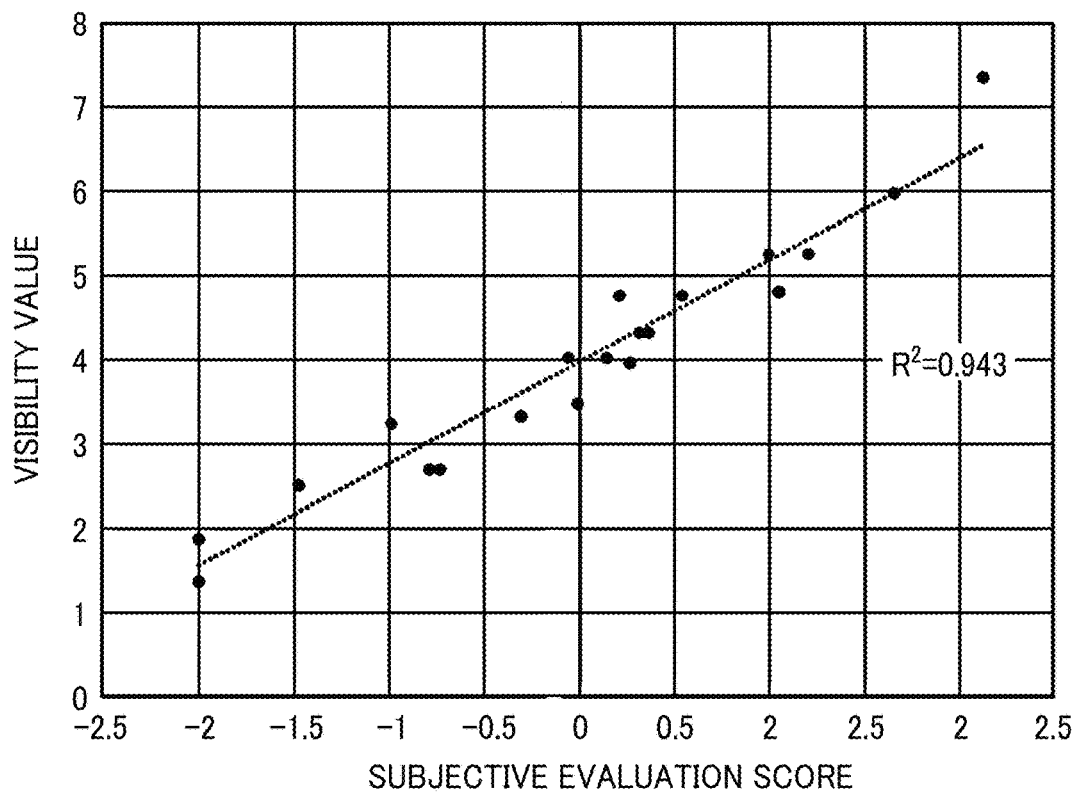
FIG. 10 is a graph of a relation between the subjective evaluation score and the visibility value.

Herein, the visibility value represented by the expression [1] calculated with $b_0$=0.195 and $b_1$=−0.193 has a higher correlation ($R^2$=0.943) with the subjective evaluation score (the Shaeffer's method of paired comparisons) when the processing conditions and the contents contained in the container body are changed as illustrated in FIG. 10.

Barcode Reading Evaluation of the Barcode on the Container Body

The relation between the visibility value of the barcode formed on the container body by the laser light and the success rate of the barcode reading was examined. The sample (i.e., the container body, the PET bottle) was prepared so that a barcode was formed by changing laser processing conditions in a container body. The contents in the container body were changed, and the barcode was read by the barcode reader to check whether the barcode was read or not. The success rate of the barcode reading was obtained.

Sample: six samples with different laser processing
Content: water, coffee, milk coffee, tea, and soy sauce
Barcode reader: BC-BR900L (LED light source) manufactured by BISCOM
Criterion for success of reading barcode
Reading the barcode within 1 second
Success rate: calculating the number of successful readings to 10 trials
Evaluation environment: office room There are a one-dimensional barcode reader and a two-dimensional barcode reader. In terms of reading speed, the two-dimensional barcode reader is much faster than the one-dimensional barcode reader. In addition, performance of reading a barcode that is hard to read or bulk reading is higher. The performance of the one-dimensional barcode reader is lower than that of the two-dimensional barcode reader, but one-dimensional barcode reader is versatilely used in a whole society. Thus, the evaluation of the performance depends on whether the one-dimensional barcode reader can read the barcode or not. In the present embodiment, a one-dimensional barcode reader described above is used.

Figure 11:
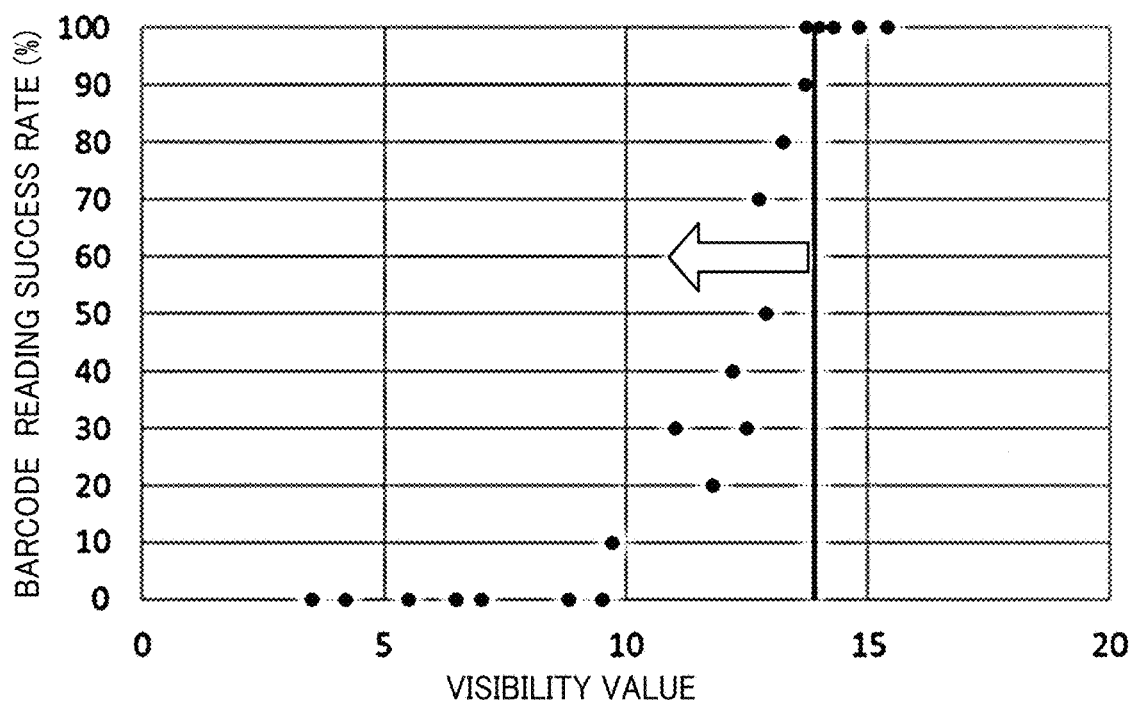
FIG. 11 is a graph of the relation between the visibility value of the barcode formed by laser processing on the container body and the reading success rate of the barcode.

FIG. 11 is a graph of the relation between the visibility value and the barcode reading success rate of the barcode formed on each sample (i.e., PET bottle). The visibility value of the barcode on the PET bottle containing the content described above was measured and the barcode was read by the barcode reader. As a result, the barcode reading was unstable when the visibility value of the barcode given by the expression [1] described above was 14 or less, in which each sample (i.e., container) contains the content. It was also found that the visibility value is further lowered, the barcode was almost impossible to read. According to the relation between the visibility value and the barcode reading success rate, the quality of reading a barcode formed by the laser light on a container body is determined irrespective of the kind of content (liquid) contained in the container body. This allows a reliable and prompt decision making to set a barcode on the top surface of its cap when the visibility value is 14 or less (When the visibility value is evaluated as 14 or less, a decision to provide the barcode on the top surface of the cap is quickly made).

In the container according to the embodiments, a visibility value of the first image of the container body containing a content given by an expression [1] below is 14 or less, and a symbol contrast of the identification cord on the cap given by an expression [2] below is 30% or more, $$\text{visibility value} = b_0 \cdot L^*_0 \cdot (1-\exp(b_1 \cdot \Delta L^*)), \quad [1]$$

where $L^*_0$ is a lightness value of the first image,
$\Delta L^*$ is a difference between the lightness value of the first image and a lightness value of a portion of the container body excluding the first image,
$b_0$ is a positive real number, and
$b_1$ is a negative real number, and $$\text{symbol contrast} = |(\text{diffuse reflectance of the background portion}) - (\text{diffuse reflectance of the code portion})|. \quad [2]$$

Barcode Reading Evaluation of the Barcode on the Top Surface of the Cap

When a barcode is provided on the top surface of the cap, the barcode becomes smaller. If the smaller barcode does not have a sufficient contrast to read, the read error is increased. A criterion for evaluation and determination of the quality of the barcode reading to the smaller barcode on the top surface of the cap is provided. A symbol contrast is given by the expression [2] below:

$$\text{symbol contrast} = |(\text{diffuse reflectance of the background portion of the identification code}) - (\text{diffuse reflectance of the code portion of the identification code})|. \quad [2]$$

Depending on the design of the container as a whole, materials having various colors are used for the cap. When the barcode is printed with the same color or a similar color with the color of the cap, the symbol color becomes lower. In such a case, the smaller barcode on the top surface of the cap causes many read errors.

In view of the circumstances above, the relation between the symbol contrast of the barcode, which is reduced in size and printed on the top surface of the cap, and the reading success rate of the barcode was examined. Each color of the cap and each color of the barcode printed on the top surface of the cap were changed. In the reading evaluation, the barcode was read and determined whether the barcode was red or not, and the success rate was obtained. In the barcode reading evaluation, the polypropylene (PP) plate was used as an substitute for the cap. The color of the PP plate imitated the color of the cap. The barcode was printed on the PP plate. The size of the barcode that is printable on the top surface of the cap is 50%.

Figure 12:
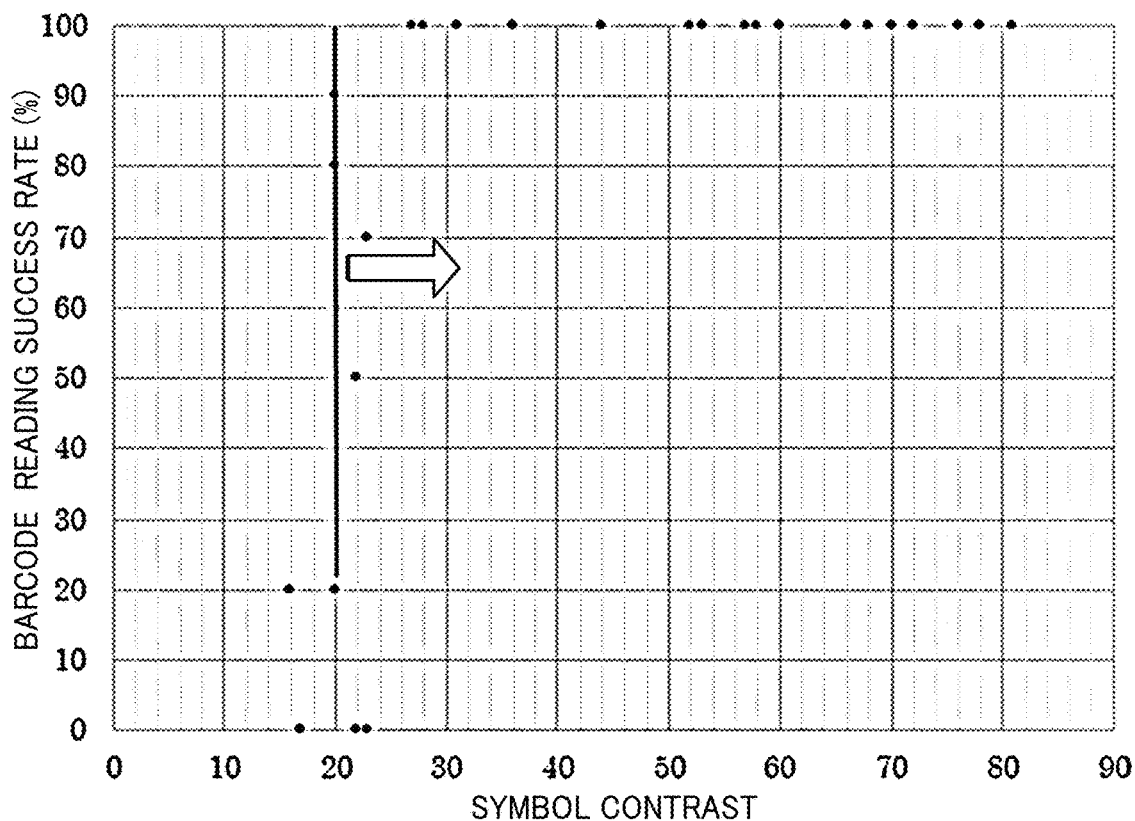
FIG. 12 is a graph of the relation between the symbol contrast of the barcode provided on the cap and the reading success rate of the barcode.

Cap color (PP plate color): white, black, dark green, and yellow
Barcode color: white, black, light green, light yellow, brown, and purple
Barcode reduction rate: 50%
Barcode reader: BC-BR900L (LED light source) manufactured by BISCOM
Criterion for success of reading barcode: Reading the barcode within 1 second
Success rate: calculating the number of successful readings to 10 trials
Evaluation environment: office room The symbol contrast of the samples described above was measured. The barcode printed on each sample was read by the barcode reader, and the relation between the symbol contrast and the reading success rate was obtained. FIG. 12 is a graph of the relation between the symbol contrast and the reading success rate of the barcode. As a result, in each color cap (alternatively, each polypropylene plate) on which each color barcode was printed, a 100% reading success rate was stably obtained when the symbol contrast of the barcode was 30% or more. Using an index based on the relation between the symbol contrast and the barcode reading success rate, any color cap can be used for the product design, and the quality of the barcode reading with respect to the smaller barcode provided on the top surface of the cap is determined. Based on the determination, a decision to provide a barcode having the symbol contrast of 30% or more is quickly made.

As described above, when the barcode formed on the container body is read by a barcode reader, the reading success rate becomes lower when the visibility value given by the expression (1) is 14 or less, but a predetermined aim is achieved when an illustration or a character is clearly visible even when the visibility value is 14 or less. A laser writing condition for accurate visual recognition in laser processing was evaluated in the laser processing.

Subjective Evaluation Method

Figure 13:
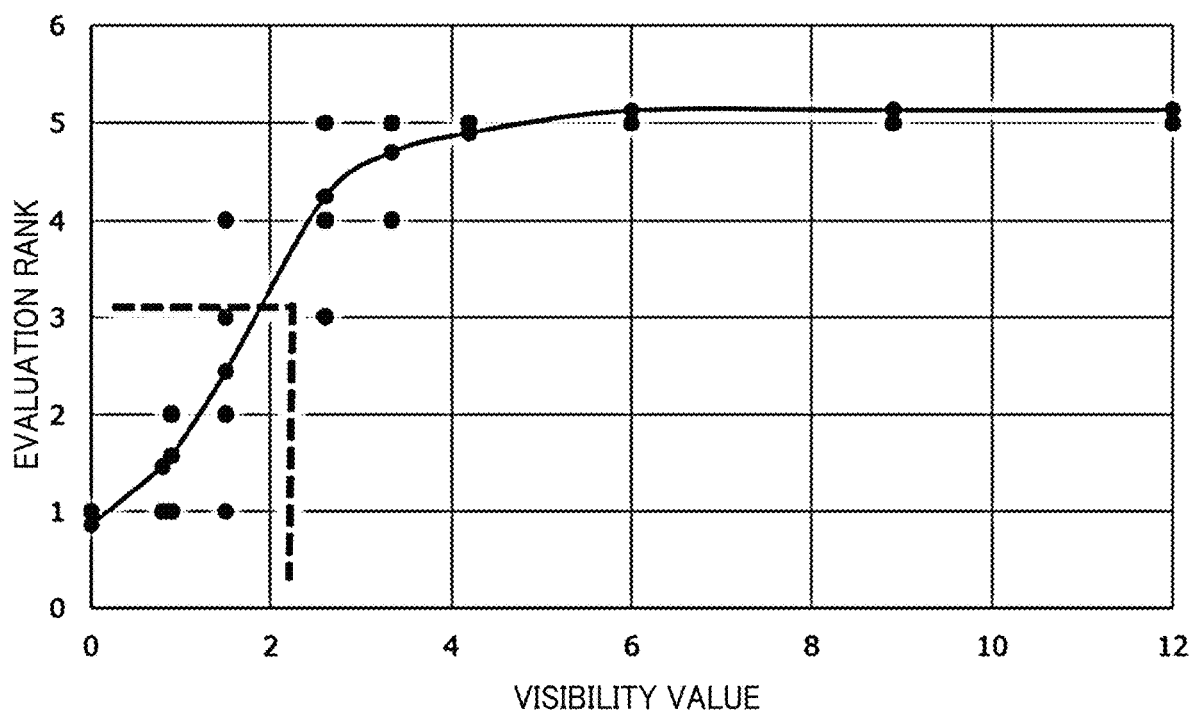
FIG. 13 is a graph of a relation between the visibility value and the evaluation rank.

With respect to a sample in which an image (character) was laser-processed under the conditions below, a subjective evaluation of the image was conducted, and the visibility was evaluated in five-step evaluation. FIG. 13 is a graph of the result of the subjective evaluation described above.

Evaluation Condition
Evaluator: 30 people
Samples: 10 samples having characters of 5.5 point (pt) formed under various conditions of the laser processing and including various contents (e.g., water or tea)
Evaluation environment: typical office room
Evaluation method: The evaluators conduct the subjective evaluation according to the five-step evaluation (evaluation ranks) below.

Evaluation Ranks
1: Unreadable
2: Less readable
3: Readable
4: More readable
5: Most readable According to the results in FIG. 13, although there was a slight variation due to the subjective evaluation, the average value was equal to or higher than the evaluation rank 3 in which the characters is readable when the visibility value is 2 or higher. When the visibility value was 6 or more, all of the evaluator evaluate the evaluation rank of 5 (i.e., Most readable).

Figure 14:
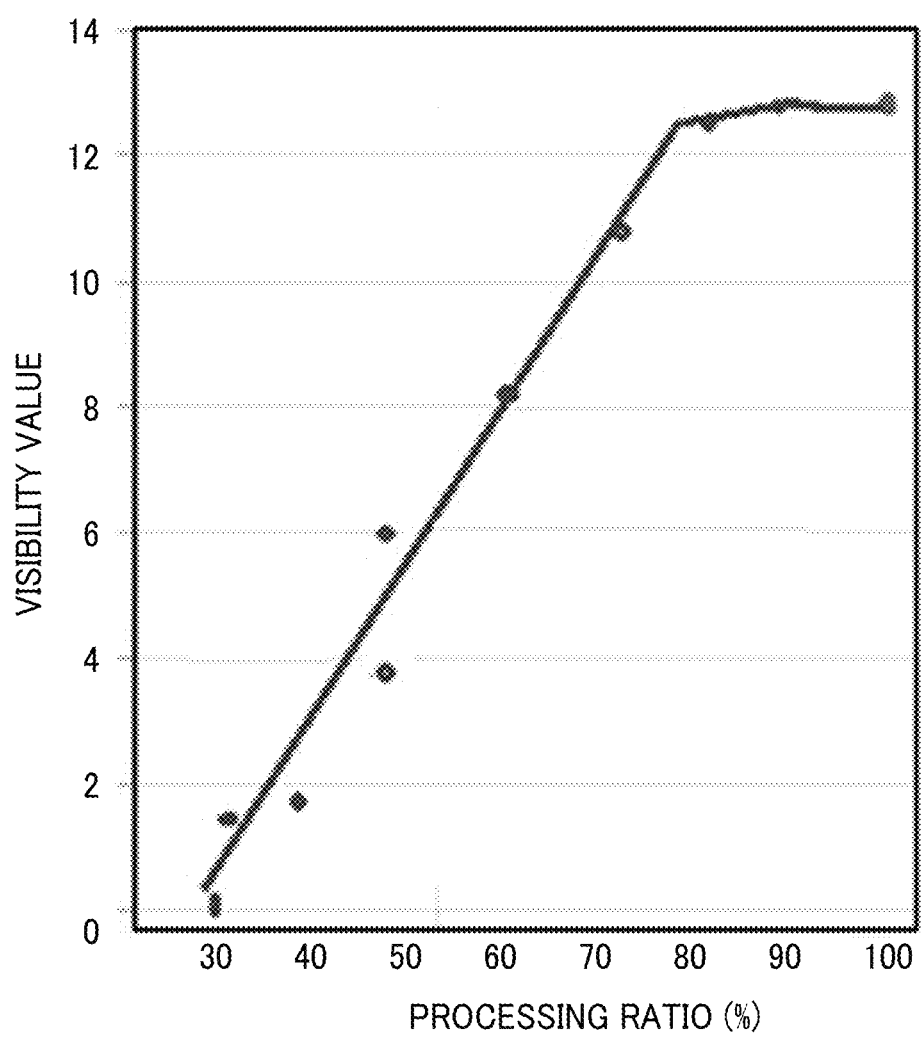
FIG. 14 is a graph of a relation between the processing ratio and the visibility value.

In view of the above, the relation between the ratio of the area of the multiple concaves to the area of the image [(the area of the multiple concaves)/(the area of the image)×100] and the visibility value was examined. The ratio may be referred to as a "processing ratio". As illustrated in FIG. 14, in a region in which the processing ratio is lower, there is a correlation between the processing ratio and the visibility value. When the processing ratio is lower, the visibility is decreased. When the processing ratio was 50% or more, the visibility value is about 5 or more, and when the processing ratio is 40% or more, the visibility value is 2 or more. Thus, the productivity increases as the processing ratio decreases, and for example, if the processing ratio is 50%, the productivity is doubled by simple calculation. However, when the processing ratio is less than 40%, though the productivity is higher, the quality of the visibility value is lower. When the processing ratio is increased, the visibility is increased. However, when the processing ratio is 85% or more, the visibility value is hard to change. Thus, the maximum visibility value is obtained at a processing ratio of 85%, and the productivity is increased by 15%. Thus, when the processing ratio is 40% or more and 85% or less, a preferable region in which visibility and productivity are compatible is obtained. In the case where the processing ratio is 40% or more, an image having a better visibility while maintaining higher productivity is provided. Further, in the case where the processing ratio is 50% or more, an image having the maximum rank in the subjective evaluation of the image is formed.

In the container according to the embodiments, the visibility value is two or more.

Figure 15A:
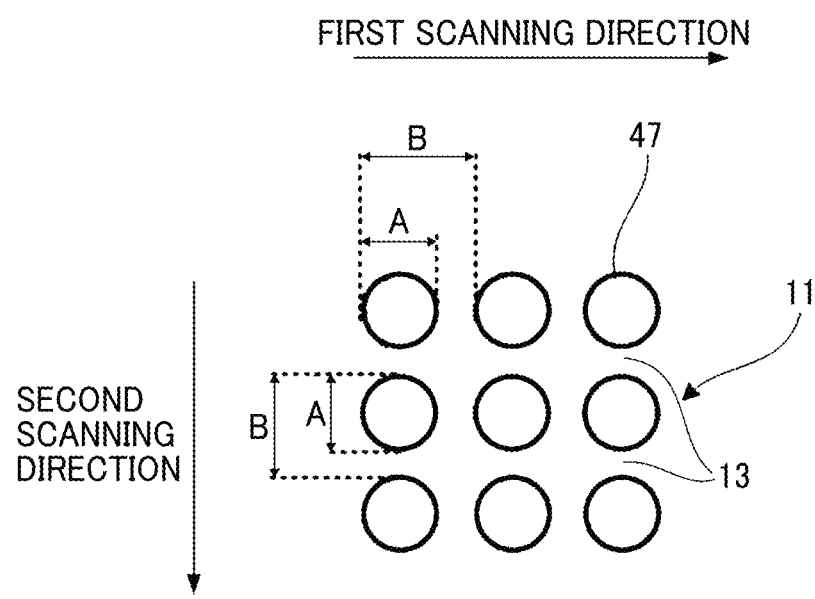
FIG. 15A is a diagram of an image including multiple concaves and non-concave portions.
Figure 15B:
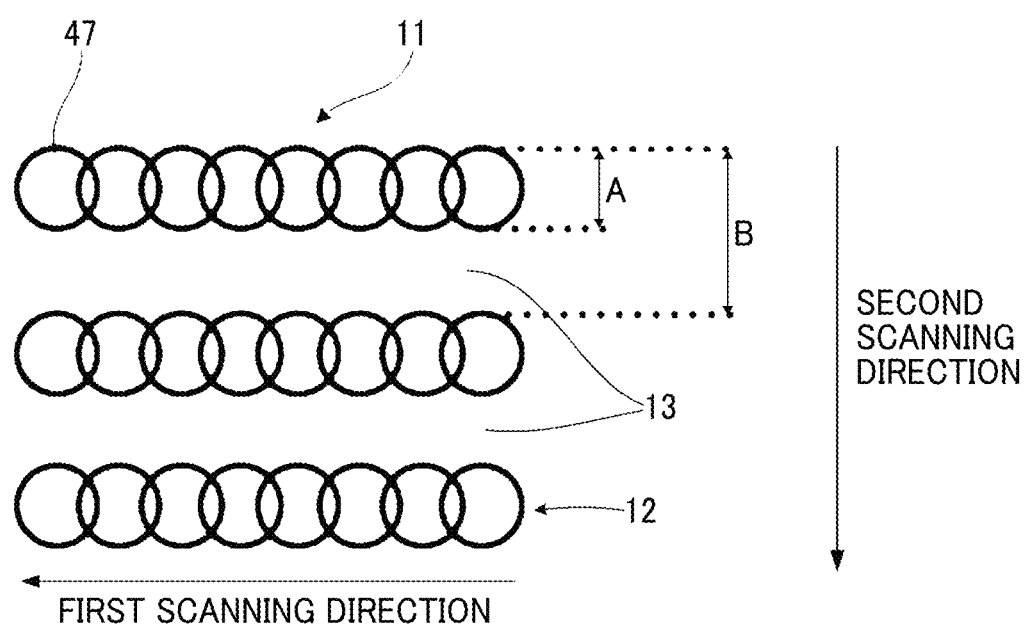
FIG. 15B is a diagram of another image including the multiple concaves and the non-concave portions.
Figure 15C:
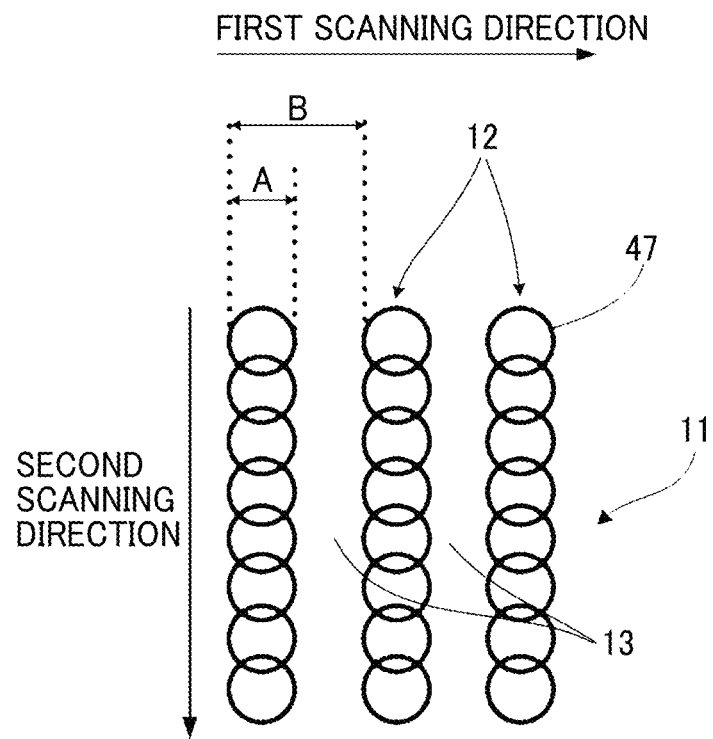
FIG. 15C is a diagram of still another image including the multiple concaves and the non-concave portions.
Figure 15D:
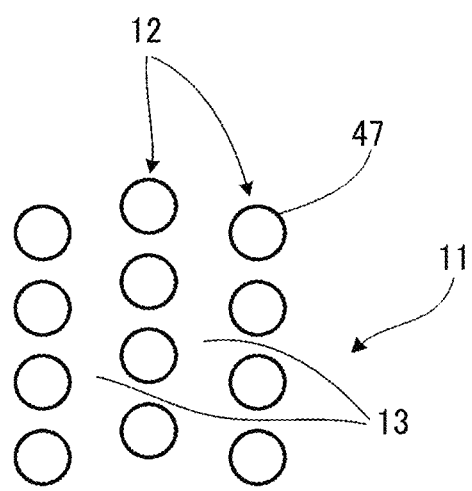
FIG. 15D is a diagram of still another image including the multiple concaves and the non-concave portions.
Figure 15E:
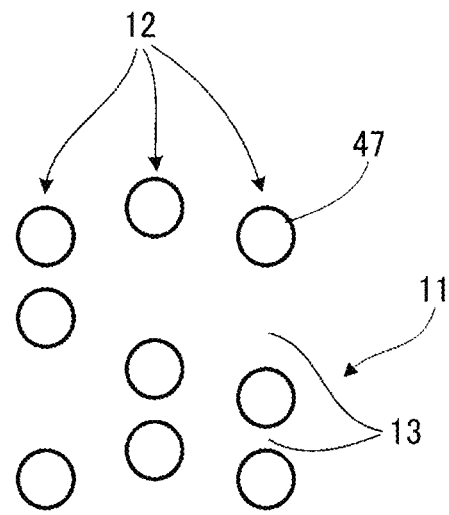
FIG. 15E is a diagram of still another image including the multiple concaves and the non-concave portions.
Figure 15F:
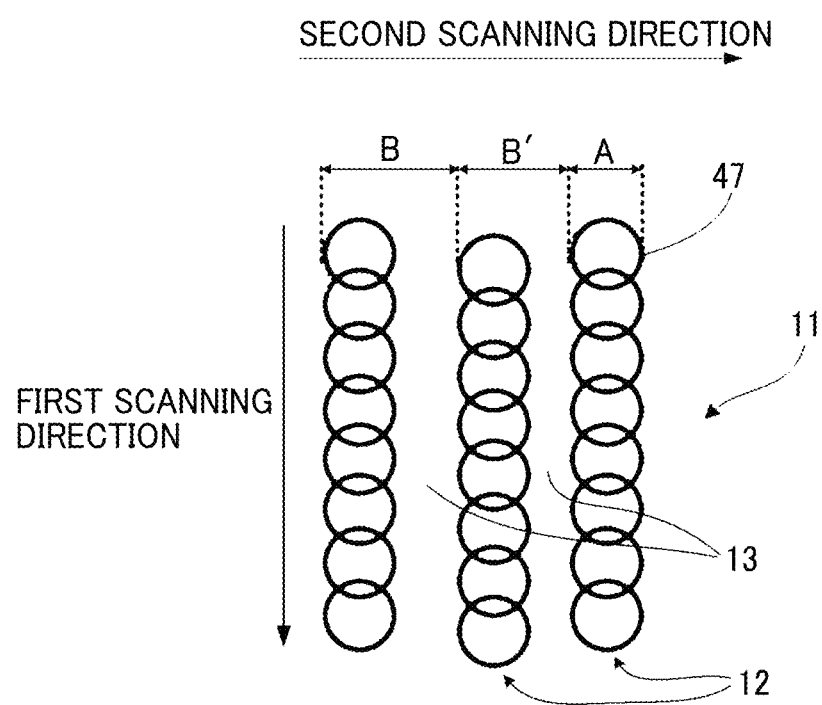
FIG. 15F is a diagram of still another image including the multiple concaves and the non-concave portions.

In FIGS. 15A to 15F, specific examples of the image 11 including multiple concaves and non-concave portions. The concave 12 is formed by multiple processed portions 47. The multiple processed portions 47 are linearly arranged. As illustrated in FIGS. 15B, 15C, and 15F, preferably, the multiple processed portions 47 are linearly arranged in contact or overlapping with each other for a better visibility. Further, a case where the multiple processed portions 47 are arranged along the first scanning direction (i.e., the main scanning direction) as illustrated in FIG. 15F and a case where the concaves 12 are arranged along the second scanning direction (i.e., the sub-scanning direction) as illustrated in FIG. 15C are compared with respect to the scanning speed. In FIG. 15C and FIG. 15F, for example, the width A is 120 μm and the width B is 200 μm. Further, in the drawings in FIGS. 15A to 15F, the shape of the container body is cylindrical, and the surface of the container body is curved in the left-right (i.e., vertical) direction of the drawings. The area of 25 cm² is processed under the condition described above. The speed of the process of the case where the multiple processed portions 47 are arranged along the first scanning direction (i.e., the main scanning direction) as illustrated in FIG. 15F is twice as fast as that of the case where the concaves 12 are arranged along the second scanning direction (i.e., the sub-scanning direction) as illustrated in FIG. 15C. The productivity is higher when the multiple processed portions 47 are linearly arranged along the first scanning direction (i.e., the main scanning direction). As illustrated in FIGS. 15A, 15D, and 15E, in a case where the multiple processed portions 47 are arranged along the first scanning direction, the transmitted light around the non-concave portion 14 of the processed portions 47 has a larger influence. However, since the non-concave portion 13 is provided between the concaves, the deformation of the container caused by heat generation or the color change caused by the property change of the material is prevented.

In the container according to the embodiments, the first image includes a non-concave portion between the multiple concaves.

In the container according to the embodiments, the first image includes a non-concave portion between each of the multiple concaves.

The processing ratio is calculated by the width A in the second scanning direction perpendicular to the first scanning direction of the processed portion 47 constituting the concave, the width A in the second scanning direction of the processed portion 47 plus the width B in the second scanning direction of the non-concave portion 13. For example, when an image 11 having a resolution of 200 dpi is formed, and when the processed portion 47 is in the form of dots as illustrated in FIG. 15A, the processing ratio is calculated by an expression [3] below.

$$\text{processing ratio} = (A/2)^2 \times \pi / B^2 \quad [3]$$

When A is 90 μm and B is 127 μm, the processing ratio is 40%. When the processed portion 47 is in contact with each other, and, for example, A is 127 μm and B is 127 μm, the processing ratio is 79%.

In the container according to the embodiments, a ratio of a concave area of the multiple concaves to an area of the first image given by an expression [3] below is 40% or more and 85% or less, $$\text{processing ratio} = (A/2)^2 \times \pi / B^2. \quad [3]$$

Further, as illustrated in FIG. 15B, when the processed portions 47 are arranged in a line along the first scanning direction with the concave overlapped with each other, the processing ratio is represented by A/B, and when A is 50 μm and B is 127 μm, the processing ratio is 40%. When the processed portions 47 are in contact with each other, for example, when A is 120 μm and B is 127 μm, the processing ratio is 95%. The processed portion 47 may be arranged in either the vertical direction or the horizontal direction (FIG. 15C). The width A of the processed portion 47 in the second scanning direction and the width B of the non-concave portion 13 in the second scanning direction may not be identical in the image 11 (FIGS. 15D, 15E, and 15F), and may be arranged at random.

In the container according to the embodiments, the multiple concaves are continuously arranged without a space in a line along a first scanning direction.

Figure 16A:
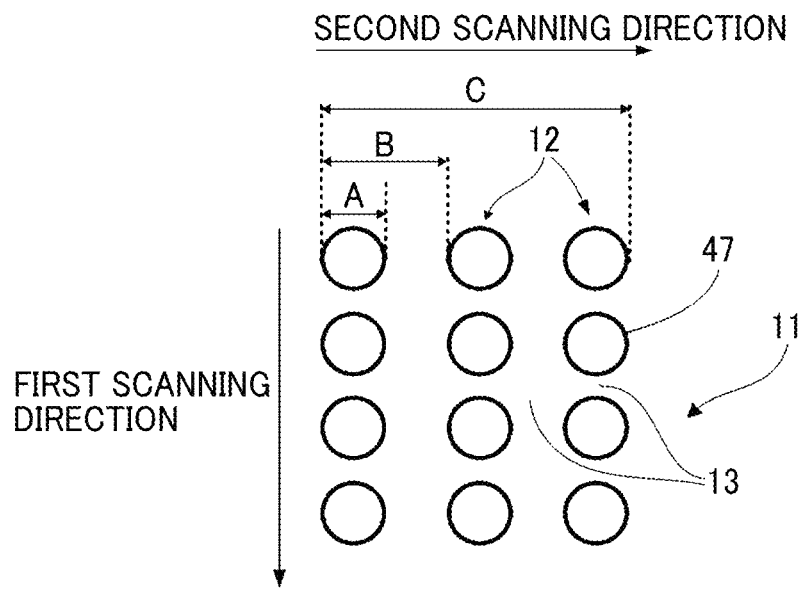
FIG. 16A is a diagram of an image in which the size of a processed portion constituting the concave is equal to or less than one dot width of a resolution.
Figure 16B:
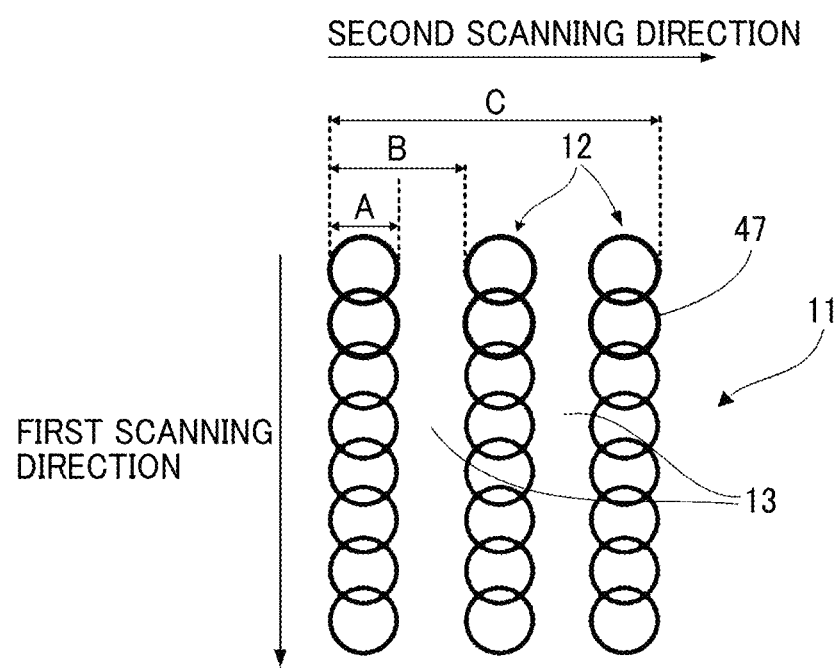
FIG. 16B is a diagram of another image in which the size of the processed portion constituting the concave is equal to or less than one dot width of the resolution.
Figure 16C:
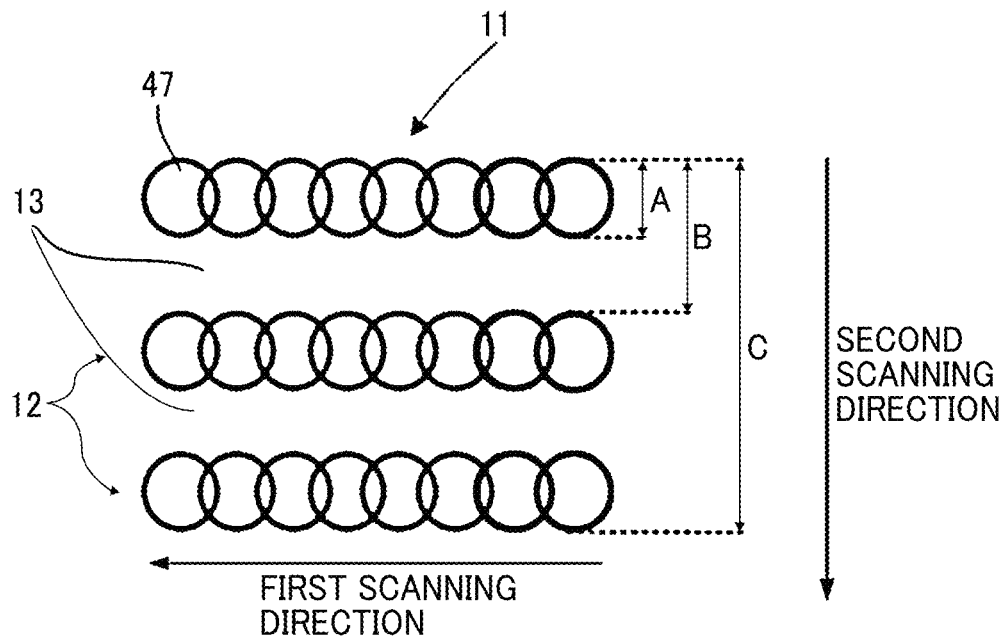
FIG. 16C is a diagram of another image in which the size of the processed portion constituting the concave is equal to or less than one dot width of the resolution.

Preferably, the width of the concave in the second scanning direction (i.e., sub-scanning direction) orthogonal to the first scanning direction is one dot or less of a predetermined resolution in order to increase the visibility. Herein, the predetermined resolution is, for example, 200 dots per inch (dpi). For example, when an image having a resolution of 200 dpi is formed, as illustrated in FIGS. 16A, 16B, and 16C, the width C of the minimum one dot in the second scanning direction (i.e., the sub-scanning direction) is 127 μm. The width B of the non-concave portion 13 in the second scanning direction includes the width A of the processed portion 47 and is 40 μm. In the laser processing, the concaves 12 is formed so that the multiple processed portions 47 are arranged in a line, and the size of the one dot is minimum in the second scanning direction. As a result, three lines of the concaves 12 fit within the width C in the second scanning direction. As a result, the surface of the container body is roughened by forming the smaller concaves 12, and visibility is increased.

In the container according to the embodiments, a sum of a width of one concave among the multiple concaves and a width of the non-concave portion between the multiple concaves is equal to or smaller than a width of a one dot in the first image in a predetermined resolution in a second scanning direction orthogonal to the first scanning direction.

The width B in the second scanning direction in the non-concave portion 13 is 40 μm. In addition, the width B may be 63 μm or 80 μm. In the case where the width B is 63 μm, a dot or two lines of the concaves 12 are arranged, and in the case where the width B is 80 μm, a dot or a one and half (1.5) lines of the concaves are arranged in the second scanning direction in the non-concave portion 13. In such cases, the visibility is increased similarly to the case where the width B in the second scanning direction in the non-concave portion 13 is 40 μm. Further, by satisfying the processing ratio of 40% or more and 85% or less, visibility increases, productivity increases by reducing the processing area, and deformation of the container body and material change due to heat generation can be prevented. The lines or dots of the processed portion 47 may be arranged vertically or horizontally, and the width A of the processed portion 47 in the second scanning direction and the width B of the non-concave portion 13 in the second scanning direction may not be the same in the image 11, but may be arranged randomly.

Cap

The material, shape, size, structure, or color of the cap is not particularly limited, and can be appropriately selected according to applications.

A material of the cap (i.e., sealing material) may be appropriately selected according to applications and is not particularly limited thereto. Examples of material include resin, glasses, metal, and ceramics. Among these materials. resin is preferably used in terms of mouldability. As the resin of the cap, a resin similar to that of the main body of the container can be used. The color of the cap may be, for example, colored opaque, or colored transparent. Among these colors, the colored transparent is preferable in terms of preferably used in terms of readability. The shape and size of the cap may be appropriately selected according to applications, as long as the cap seals the open or the content in the container body and are not particularly limited thereto.

The structure of the cap is not particularly limited and can be appropriately selected according to the applications, it is preferable that the cap includes, for example, a first portion which is separated from the container body when opened and a second portion which remains in the container body. Preferably, the first portion has a jagged portion on the surface as an anti-slip portion when opening the sealing. Preferably, the second portion has no jagged portion and a flat surface.

In the present embodiment, an identification code is provided on the top surface of the cap. Examples of the identification code include a one-dimensional barcode and a two-dimensional barcode. Among the examples, a one-dimensional barcode is preferable to a general purpose. Typically, the term "barcode" represents a one-dimensional barcode, but in the international organization for standardization (ISO) and the international electrochemical commission (IEC) standard (ISO/IEC standard), the bar code includes a two-dimensional bar code. The barcode is an inclusive term of codes represented by bars referred to as barcode symbols. The barcode includes information on point of sales (POS), for example, country names, business types, product names, prices, and other information for distribution and product management. The POS information is read by a handy terminal or a barcode reader.

Figure 17:
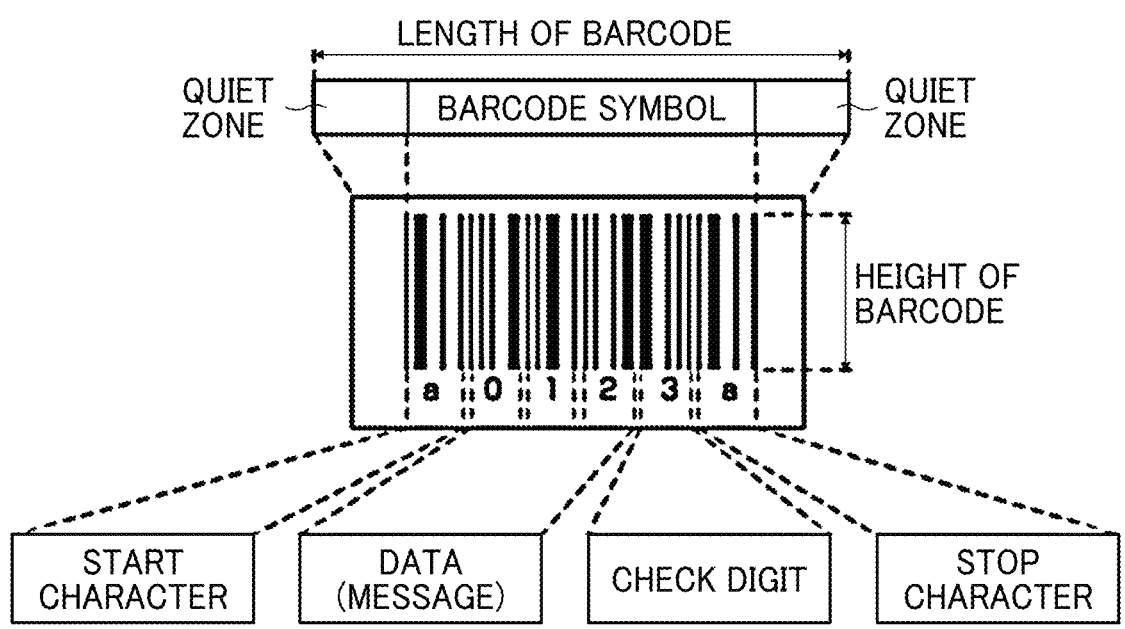
FIG. 17 is a diagram of a one-dimensional barcode as an example.

FIG. 17 is a diagram of a one-dimensional barcode as an example. The quiet zone (i.e., a margin) is a portion of a blank space on the left and right of the barcode symbol. If the quiet zone does not have an enough space, the image is not read. The quiet zone on both sides of the barcode have at least 10 times wider width of the narrow bar (i.e., the size of the minimum element).

The start/stop character is a character representing the start and end of data. The start and stop (start/stop) character depends on the type of the barcode. In case of CODE 39, the start/stop character is represented by "*", and in case of NW-7, the start and stop characters are represented by "a", "b", "c" and "d".

In "data (message)", the pattern of the bars (bar pattern) of the characters (e.g., numbers or alphabet) represented as data is arranged from the left side. In FIG. 17, the bar patterns representing characters 0, 1, and 2 are arranged in order from the left to represent data "012".

The "check digit" is a calculated numerical value added immediately after the barcode data in order to check whether there is any reading error or not.

The length of barcode includes the left and right quiet zones. The barcode reader has a reding width. If the barcode including the quiet zone does not fit within the reading width of the barcode reader, the barcode is not read.

Preferably, "the height of the barcode" is a maximum printable value. If the height is lower, the laser light may deviate from the barcode and the barcode is not read stably. Preferably, the height of the barcode is 15% or more of the length of the barcode.

Figure 18:
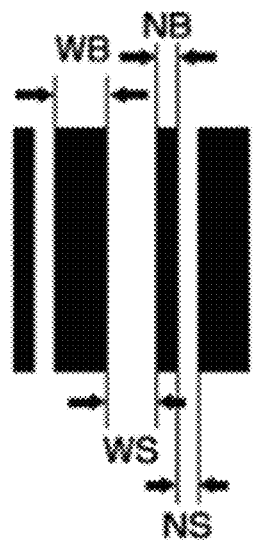
FIG. 18 is a diagram of bars and spaces in the one-dimensional barcode.

FIG. 18 is a diagram of bars and spaces in a one-dimensional barcode. The one-dimensional barcode includes a thin bar (narrow bar, NB), a thick bar (wide bar, WB), a thin space (narrow space, NS), and a thick space (wide space, WS) in FIG. 18, and consists of the combination thereof.

In one aspect, the identification code is a one-dimensional bar code, and an image is formed on the container body on a (virtual) line extended from the barcode in the longitudinal direction of the bar of the one-dimensional barcode. According to the aspect, the barcode read error is reduced, and the operability at the time of scanning of the barcode is increased.

Figure 19:
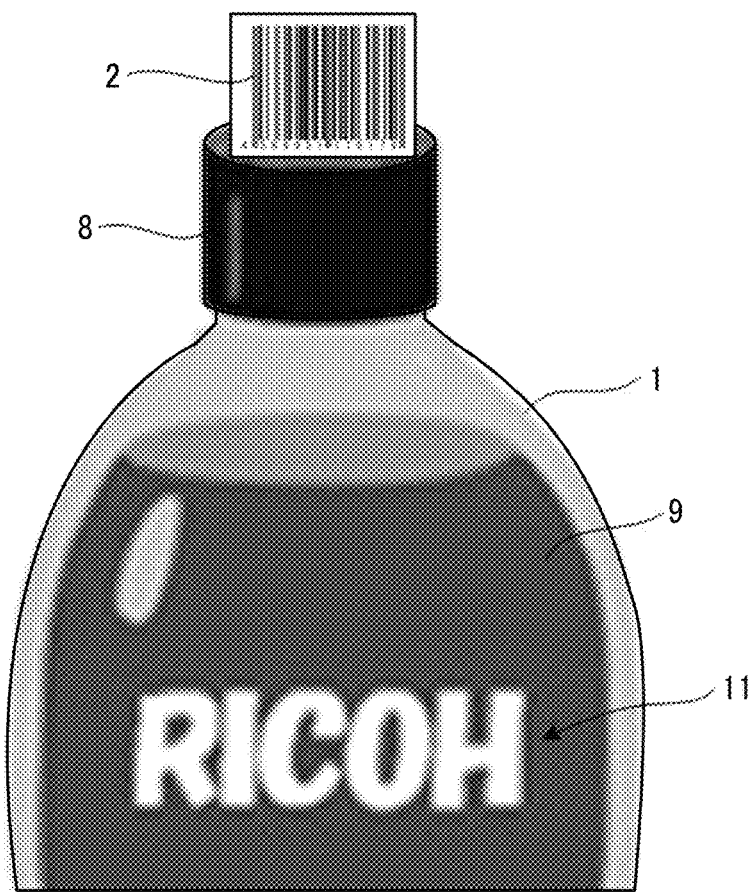
FIG. 19 is a diagram of a one-dimensional barcode provided on the top surface of a cap and an image provided on a container body.

FIG. 19 is a diagram of a one-dimensional barcode provided on the top surface of a cap and an image provided on a container body. As illustrated in FIG. 19, the image 11 is formed on the container body 1 on a line virtually extended from the barcode in the longitudinal direction of the bar of the one-dimensional barcode 2 provided on the top surface of the cap 8. Thus, the bars of the one-dimensional barcode 2 are arranged in palisade from whose palisades extend in the longitudinal direction of the barcode with respect to the image 11 of the container body 1. An experiment on barcode reading was conducted with respect to two cases. In a first case, a one-dimensional barcode 2 was provided so that the image 11 formed on the container body 1 is arranged in an extension line along the longitudinal direction of the bar as illustrated in FIG. 19. In a second case, the one-dimensional barcode 2 was provided regardless of the direction of the image 11 formed on the container body 1. In other words, the experiment checked whether the barcode reading has an orientation dependence or not. As a result, in the second case, verification work on checking the orientation of the barcode on the top surface of the cap in each barcode reading occurred. By contrast, in the first case, since the image formed on the container body indicates the orientation of the barcode on the top surface of the cap as illustrated in FIG. 19. This orientational relation between the barcode omitted the verification work and the time of the barcode reading for 100 lines was shortened by about 150 seconds. According to the present embodiments, it is easy to intuitively operate when reading a barcode at a cash register, and the read error of the barcode is reduced.

In the container according to embodiments, the identification code is a one-dimensional barcode, the one-dimensional barcode includes multiple bars extending in an extension direction orthogonal to a longitudinal direction of the one-dimensional barcode, and a length of a central bar in the multiple bars at a central portion of the one-dimensional barcode is longer than a length of an end bar in the multiple bars at an end portion of the one-dimensional barcode in the extension direction.

In one aspect of the present invention, the identification code is a one-dimensional barcode, and the length of the bar of the one-dimensional barcode in the longitudinal direction differs between the center portion and the end portion of the one-dimensional barcode in the shorter direction thereof. According to the aspect, the barcode read error is reduced, and the operability at the time of scanning of the barcode is increased.

In the container according to the embodiments, the identification code is a one-dimensional barcode, the one-dimensional barcode includes multiple bars extending in an extension direction orthogonal to a longitudinal direction of the one-dimensional barcode, and a length of a central bar in the multiple bars at a central portion of the one-dimensional barcode is longer than a length of an end bar in the multiple bars at an end portion of the one-dimensional barcode in the extension direction.

Figure 20A:
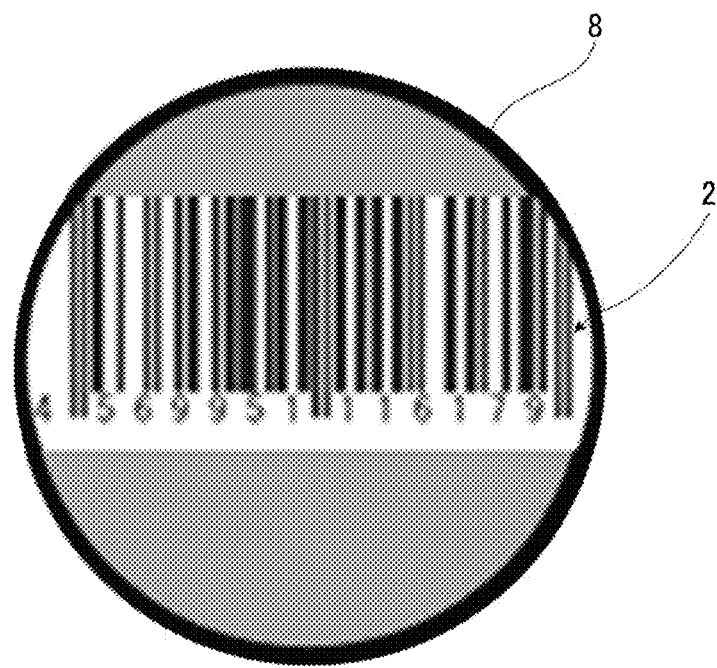
FIG. 20A is a diagram of a barcode provided on the top surface of a cap of a typical PET bottle.
Figure 20B:
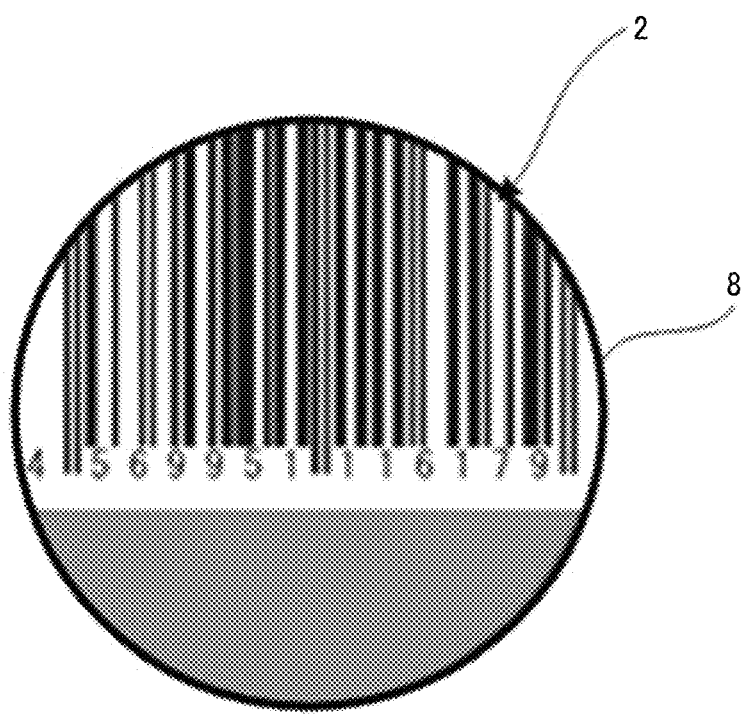
FIG. 20B is a diagram of a one-dimensional barcode in which the length in the longitudinal direction of the bar of the one-dimensional barcode provided on the top surface of the cap is different at the center portion and the end portion in the shorter direction of the bar of the one-dimensional barcode.

Since the regular size of the 13-digit barcode JAN-13, which is a commercial barcode commonly used in Japan, is larger than the cap used for the beverage bottle, the size of the barcode be reduced when printing on the cap. According to the International Standard (ISO) of the barcode, the reduction rate that guarantees the reading quality is up to 80%. Thus, in order to provide the barcode on the cap, the size of the barcode is smaller than 80%. However, in order to maintain the reading quality of the barcode, preferably, the size of the barcode is not reduced as much as possible. For example, when the barcode is provided on the top surface of the cap of a typical PET bottle as illustrated in FIG. 20A, the reduction ratio becomes about 50%. In this case, if the contrast of the barcode is lower, the reading error increases. As illustrated in FIG. 20B, since the cap is circular, by setting the length of the center portion and the end portion of the one-dimensional barcode provided on the top surface of the cap 8 to be different in the lateral direction, the barcode of the maximum size becomes larger in the lateral direction. The bar of the center portion of the barcode is longer in the longitudinal direction, so that the barcode is recognized as a larger size. When a reading test was conducted with a barcode of the present embodiment having a symbol contrast of 25% and a barcode having a normal reduction ratio of 50%, the reading success rate was increased from 30% to 80%. In the product design, the symbol contrast may become lower by selecting the color of the cap and the color of the barcode (i.e., combination thereof). However, according to the present embodiment, even if the symbol contrast is lower, the barcode is read, and many colors of the cap and the barcode are available.

In one aspect of the present embodiment, the diffuse reflectance of the image portion is larger than that of the non-image portion, in which the bright portion and the dark portion are inverted with respect to the original image, and the diffuse reflectance of the code portion of the barcode is smaller than that of the background portion, in which the bright portion and the dark portion are not inverted According to the aspect, the barcode read error is reduced. The barcode as a positive image or a negative image is allowable. In the positive image, the bar portion of the barcode is darker and the space portion of the barcode is brighter. By contrast, in the negative image, the bar portion of the barcode is brighter and the space portion of the barcode is darker. In other words, the positive image and the negative image are reciprocal. When the PET bottle is processed by laser marking, the processed portion becomes brighter and is a negative image. Most of the commercially available barcode readers are capable of handling both positive and negative images, but some of the commercially available barcode readers only handles positive images. Thus, the read error is reduced by applying the positive image as the barcode of the cap.

In the container according to the embodiments, a diffuse reflectance of the first image is larger than a diffuse reflectance of the portion excluding the first image, and a diffuse reflectance of the code portion of the identification code is smaller than a diffuse reflectance of background portion of the identification code.

Container Body

The container of the present embodiment includes the container and a content in the container. Examples of the content include liquid, gas, and granular solid. Examples of the liquid include water, tea, coffee, black tea, and soft drink. When the content is a liquid beverage, the liquid beverage may be transparent, or have a color such as white, whitish, darker, black, brown, yellowish, or yellow. Examples of the gas include oxygen, hydrogen, and nitrogen. Examples of the granular solid include, pieces or granules of fruits, vegetables, nata de coco, tapioca, jelly, konjac (konnyaku, yam cake).

A container product includes: the container according to the embodiments; and a content in the container.

Container Manufacturing Method and Container Manufacturing Apparatus

In the present embodiment, the container manufacturing method is the method to manufacture the container according to the present embodiment. The method includes a process in which the laser light is emitted to the container body to form an image; preferably, a process including at least one of the rotation process or the convey process; and other processes. In the present embodiment, the container manufacturing apparatus is the apparatus to manufacture the container body according to the present embodiment. The apparatus includes a process in which the laser light is emitted to the container body to form an image; preferably, a process including at least one of the rotation process or the convey process; and other processes.

Preferably, the spot diameter of the laser light is from 1 μm to 200 μm, and more preferably from 10 μm to 100 μm. When the spot diameter becomes smaller than 1 μm, which becomes closer to the wavelength of visible light, the structure processed with the laser light having the spot diameter does not scatter the light and is not become haze. If the spot diameter is larger than 200 μm, the structure is recognized by human eyes.

Preferably, an image is formed by controlling the intensity of the laser light. Preferably, an image is formed by scanning the laser light. Preferably, an image is formed by independently controlling the intensities of multiple laser light emitted from multiple laser light sources.

In the manufacturing method of the container used in the present embodiment, an image is formed by emitting the laser light to the container body while rotating the container body to be formed. In terms of the configuration of the apparatus, there are a case where the laser position is fixed and the container is moved, and a case where the container is fixed and the laser position is moved. Further, when the container is moved, there is a case where image formation is performed by synchronous control such that after the laser processing is performed by rotating the container at a fixed angle, the container body is rotated again at the same angle, and the laser processing is performed again, or a case where the laser processing is performed by rotating the container at a constant speed. The portion to hold the container body may be the finish, the body, or the base of the container. The container may be placed vertically, horizontally or obliquely during the laser processing.

When the container body is conveyed by the conveyor, the marking may be performed from one side or from multiple sides simultaneously.

The wavelength of the laser light emitted from the light source is preferably in the ultraviolet region and the visible region, and from the near infrared region to the middle infrared region. Specifically, a wavelength range of 1,200 nm or more and 1,500 nm or less are also preferable.

For example, a wavelength from the near infrared band to the middle infrared band is suitable for whitening by foaming (thermal deformation) at higher speed and the apparatus is easy to be arrayed. The wavelength in the ultraviolet band is suitable for laser ablation in the laser processing because the laser power can be increased. Further, since there is a wavelength in which absorption rate to the container body is remarkably higher than the peripheral wavelength for each wavelength band, it is particularly preferable to use this wavelength.

As described above, the embodiments of the present invention have been described in detail, but the embodiments of the present invention is not limited thereto. Various modifications may be made without departing from the scope of the present invention.

Aspects of the present invention are as follows, for example.

In a first aspect, a container includes: a container body; a cap to seal the container body; an identification code on a top surface of the cap; and multiple concaves on the container body. The multiple concaves on the container body forms a first image having a first area, the identification code on the cap forms a second image having a second area smaller than the first area, the container body has a first diffuse reflectance difference between the first image and a portion excluding the first image, and the identification code has a second diffuse reflectance difference between a code portion and a background portion excluding the code portion in the second image. The second diffuse reflectance difference is larger than the first diffuse reflectance difference.

In a second aspect, in the container according to the first aspect, the first image of the container body has a visibility value equal to or larger than a predetermined value given by an expression [1] below:

$$\text{visibility value} = b_0 \cdot L^*_0 \cdot (1-\exp(b_1 \cdot \Delta L^*)), \quad [1]$$

where $L^*_0$ is a lightness value of the first image,
$\Delta L^*$ is a difference between the lightness value of the first image and a lightness value of the portion of the container body excluding the first image,
$b_0$ is a positive real number, and
$b_1$ is a negative real number.

In a third aspect, in the container according to the second aspect, the visibility value is two or more.

In a fourth aspect, in the container according to the first aspect, a visibility value of the first image of the container body containing a content given by an expression [1] below is 14 or less, and a symbol contrast of the identification cord on the cap given by an expression [2] below is 30% or more, $$\text{visibility value} = b_0 \cdot L^*_0 \cdot (1-\exp(b_1 \cdot \Delta L^*)), \quad [1]$$

where $L^*_0$ is a lightness value of the first image,
$\Delta L^*$ is a difference between the lightness value of the first image and a lightness value of a portion of the container body excluding the first image,
$b_0$ is a positive real number, and
$b_1$ is a negative real number, and $$\text{symbol contrast} = |(\text{diffuse reflectance of the background portion})-(\text{diffuse reflectance of the code portion})|. \quad [2]$$

In a fifth aspect, in the container according to any one of the first aspect, the second aspect, and the fourth aspect, the first image includes a non-concave portion between the multiple concaves.

In a sixth aspect, in the container according to any one of the first aspect, the second aspect, and the fourth aspect, the first image includes a non-concave portion between each of the multiple concaves.

In a seventh aspect, in the container according to any one of the first aspect, the second aspect, and the fourth aspect, a ratio of a concave area of the multiple concaves to an area of the first image given by an expression [3] below is 40% or more and 85% or less, $$\text{a ratio} = (\text{an area of the multiple concaves})/(\text{an area of the first image}) \times 100. \quad [3]$$

In an eighth aspect, in the container according to any one of the first aspect, the second aspect, and the fourth aspect, the multiple concaves are continuously arranged without a space in a line along a first scanning direction.

In a ninth aspect, in the container according to the fifth aspect, a sum of a width of one concave among the multiple concaves and a width of the non-concave portion between the multiple concaves is equal to or smaller than a width of a one dot in the first image in a predetermined resolution in a second scanning direction orthogonal to the first scanning direction.

In a tenth aspect, in the container according to any one of the first aspect, the second aspect, and the fourth aspect, the identification code is a one-dimensional barcode, and the first image is formed in a portion of the container body on an extension line of a bar in the one-dimensional barcode in a longitudinal direction of the bar.

In an eleventh aspect, in the container according to any one of the first aspect, the second aspect, and the fourth aspect, the identification code is a one-dimensional barcode, the one-dimensional barcode includes multiple bars extending in an extension direction orthogonal to a longitudinal direction of the one-dimensional barcode, and a length of a central bar in the multiple bars at a central portion of the one-dimensional barcode is longer than a length of an end bar in the multiple bars at an end portion of the one-dimensional barcode in the extension direction.

In a twelfth aspect, in the container according to the first aspect to the third aspect, a diffuse reflectance of the first image is larger than a diffuse reflectance of the portion excluding the first image, and a diffuse reflectance of the code portion of the identification code is smaller than a diffuse reflectance of background portion of the identification code.

In a thirteenth aspect, a container product includes: the container according to any one of the first aspect to the twelfth aspect; and a content in the container.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A container comprising:
   a container body;
   a cap configured to seal the container body;
   an identification code on a top surface of the cap; and
   multiple concaves on the container body,
   wherein:
   the multiple concaves on the container body forms a first image having a first area,
   the identification code on the cap forms a second image having a second area smaller than the first area,
   the container body has a first diffuse reflectance difference between the first image and a portion excluding the first image,
   the identification code has a second diffuse reflectance difference between a code portion and a background portion excluding the code portion in the second image, the second diffuse reflectance difference larger than the first diffuse reflectance difference,
   the first image of the container body has a visibility value equal to or larger than a predetermined value given by an expression [1] below:

$$\text{visibility value} = b_0 \cdot L^*_0 \cdot (1 - \exp(b_1 \cdot \Delta L^*)), \quad [1]$$

where $L^*_0$ is a lightness value of the first image,
   $\Delta L^*$ is a difference between the lightness value of the first image and a lightness value of the portion of the container body excluding the first image,
   $b_0$ is a positive real number, and
   $b_1$ is a negative real number.

2. The container according to claim 1, wherein;
   the visibility value is two or more.

3. A container, comprising:
   a container body;
   a cap configured to seal the container body;
   an identification code on a top surface of the cap; and
   multiple concaves on the container body,
   wherein:
   the multiple concaves on the container body forms a first image having a first area,
   the identification code on the cap forms a second image having a second area smaller than the first area,
   the container body has a first diffuse reflectance difference between the first image and a portion excluding the first image,
   the identification code has a second diffuse reflectance difference between a code portion and a background portion excluding the code portion in the second image, the second diffuse reflectance difference larger than the first diffuse reflectance difference,
   wherein:
   a visibility value of the first image of the container body containing a content given by an expression [1] below is 14 or less, and
   a symbol contrast of the identification code on the cap given by an expression [2] below is 30% or more, $$\text{visibility value} = b_0 \cdot L^*_0 \cdot (1 - \exp(b_1 \cdot \Delta L^*)), \quad [1]$$

where $L^*_0$ is a lightness value of the first image,
   $\Delta L^*$ is a difference between the lightness value of the first image and a lightness value of a portion of the container body excluding the first image,
   $b_0$ is a positive real number, and
   $b_1$ is a negative real number, and $$\text{symbol contrast} = |(\text{diffuse reflectance of the background portion}) - (\text{diffuse reflectance of the code portion})|. \quad [2]$$

4. The container according to claim 1, wherein the first image includes a non-concave portion between the multiple concaves.

5. The container according to claim 1, wherein the first image includes a non-concave portion between each of the multiple concaves.

6. The container according to claim 1, wherein a ratio of a concave area of the multiple concaves to an area of the first image given by an expression [3] below is 40% or more and 85% or less, $$\text{a ratio} = (\text{an area of the multiple concaves}) / (\text{an area of the first image}) \times 100. \quad [3]$$

7. The container according to claim 1, wherein the multiple concaves are continuously arranged without a space in a line along a first scanning direction.

8. The container according to claim 4, wherein a sum of a width of one concave among the multiple concaves and a width of the non-concave portion between the multiple concaves is equal to or smaller than a width of a one dot in the first image in a predetermined resolution in a second scanning direction orthogonal to a first scanning direction.

9. The container according to claim 1, wherein:
   the identification code is a one-dimensional barcode, and
   the first image is formed in a portion of the container body on an extension line of a bar in the one-dimensional barcode in a longitudinal direction of the bar.

10. The container according to claim 1, wherein;
    the identification code is a one-dimensional barcode,
    the one-dimensional barcode includes multiple bars extending in an extension direction orthogonal to a longitudinal direction of the one-dimensional barcode, and
    a length of a central bar in the multiple bars at a central portion of the one-dimensional barcode is longer than a length of an end bar in the multiple bars at an end portion of the one-dimensional barcode in the extension direction.

11. The container according to claim 1, wherein;
    a diffuse reflectance of the first image is larger than a diffuse reflectance of the portion excluding the first image, and
    a diffuse reflectance of the code portion of the identification code is smaller than a diffuse reflectance of background portion of the identification code.

12. A container product comprising:
    the container according to claim 1; and
    a content in the container.

13. The container according to claim 3, wherein:
    the visibility value is two or more.

14. The container according to claim 3, wherein the first image includes a non-concave portion between the multiple concaves.

15. The container according to claim 3, wherein the first image includes a non-concave portion between each of the multiple concaves.

16. The container according to claim 3, wherein a ratio of a concave area of the multiple concaves to an area of the first image given by an expression [3] below is 40% or more and 85% or less, $$\text{a ratio} = (\text{an area of the multiple concaves}) / (\text{an area of the first image}) \times 100. \quad [3]$$

17. The container according to claim 3,
wherein the multiple concaves are continuously arranged without a space in a line along a first scanning direction.

18. The container according to claim 14,
wherein a sum of a width of one concave among the multiple concaves and a width of the non-concave portion between the multiple concaves is equal to or smaller than a width of a one dot in the first image in a predetermined resolution in a second scanning direction orthogonal to a first scanning direction.

19. The container according to claim 3, wherein:
the identification code is a one-dimensional barcode, and
the first image is formed in a portion of the container body on an extension line of a bar in the one-dimensional barcode in a longitudinal direction of the bar.

20. The container according to claim 1, wherein:
the identification code is a one-dimensional barcode,
the one-dimensional barcode includes multiple bars extending in an extension direction orthogonal to a longitudinal direction of the one-dimensional barcode, and
a length of a central bar in the multiple bars at a central portion of the one-dimensional barcode is longer than a length of an end bar in the multiple bars at an end portion of the one-dimensional barcode in the extension direction.

* * * * *